US012758368B2

(12) United States Patent
Tanaka et al.

(10) Patent No.: US 12,758,368 B2
(45) Date of Patent: Oct. 13, 2026

(54) THREE-DIMENSIONAL SCANNER AND CONTROL METHOD

(71) Applicant: J. MORITA MFG. CORP., Kyoto (JP)

(72) Inventors: Tsuyoshi Tanaka, Kyoto (JP); Takuya Okada, Kyoto (JP); Takeshi Hayashi, Kyoto (JP)

(73) Assignee: J. MORITA MFG. CORP., Kyoto (JP)

( * ) Notice: Subject to any disclaimer, the term of this patent is extended or adjusted under 35 U.S.C. 154(b) by 187 days.

(21) Appl. No.: 18/667,559

(22) Filed: May 17, 2024

(65) Prior Publication Data

US 2024/0390118 A1 Nov. 28, 2024

(30) Foreign Application Priority Data

May 24, 2023 (JP) ................................ 2023-085376

(51) Int. Cl.
*A61C 9/00* (2006.01)

(52) U.S. Cl.
CPC ................................ *A61C 9/0053* (2013.01)

(58) Field of Classification Search
CPC ..... A61C 9/0053; A61C 9/0066; A61C 19/04; G01B 11/2518; G01B 11/2513; G02B 26/10; G02B 7/04
See application file for complete search history.

(56) References Cited

U.S. PATENT DOCUMENTS

| | | | | |
|---|---|---|---|---|
| 2011/0221879 | A1* | 9/2011 | Schmidt | A61B 1/0669 348/E7.085 |
| 2016/0187469 | A1* | 6/2016 | Jeong | G01S 7/4817 356/5.01 |
| 2019/0293414 | A1* | 9/2019 | Sorimoto | G01B 9/02 |
| 2021/0389549 | A1* | 12/2021 | Berner | G02B 7/04 |
| 2023/0021695 | A1* | 1/2023 | Atiya | A61C 9/0053 |
| 2023/0097275 | A1* | 3/2023 | Lin | G02B 7/08 359/822 |

FOREIGN PATENT DOCUMENTS

| | | | |
|---|---|---|---|
| EP | 3 598 061 | A1 | 1/2020 |
| EP | 3 628 271 | B1 | 7/2021 |
| JP | 5-313055 | A | 11/1993 |
| JP | 2007-150996 | A | 6/2007 |

(Continued)

OTHER PUBLICATIONS

Japanese Office Action issued Aug. 19, 2025, in Japanese Patent Application 2023-085376 (with machine English translation), 6 pages.

(Continued)

*Primary Examiner* — Jonathan M Hansen
(74) *Attorney, Agent, or Firm* — Oblon, McClelland, Maier & Neustadt, L.L.P.

(57) ABSTRACT

A three-dimensional scanner includes imaging circuitry configured to take an image of an object located at a focal position of a lens, a lens driver configured to drive the lens to make reciprocating motion in a linear direction, an angle detector configured to detect variation in angle of inclination of the lens with respect to a prescribed direction, and processing circuitry configured to control an operation of the lens in accordance with the variation in angle of inclination detected by the angle detector.

10 Claims, 20 Drawing Sheets

(56) References Cited

FOREIGN PATENT DOCUMENTS

| | | | |
|---|---|---|---|
| JP | 2010-85473 | A | 4/2010 |
| JP | 2019-180881 | A | 10/2019 |
| JP | 2020-34487 | A | 3/2020 |
| JP | 2022-502176 | A | 1/2022 |

OTHER PUBLICATIONS

Extended European Search Report issued Oct. 21, 2024 in European Patent Application No. 24174611.4, 6 pages.

Japanese Office Action issued Aug. 12, 2025, in Japanese Patent Application 2023-085376 (with machine English translation), 6 pages.

* cited by examiner

THREE-DIMENSIONAL SCANNER AND CONTROL METHOD

CROSS REFERENCE TO RELATED APPLICATIONS

This nonprovisional application is based on Japanese Patent Application No. 2023-085376 filed with the Japan Patent Office on May 24, 2023, the entire contents of which are hereby incorporated by reference.

BACKGROUND

Field

The present disclosure relates to a three-dimensional scanner configured to obtain three-dimensional data of a surface geometry of an object with a focus method and a control method of controlling the three-dimensional scanner.

Description of the Background Art

A three-dimensional scanner that scans a surface geometry of an object such as a tooth and a soft tissue in a mouth cavity to obtain three-dimensional data of the surface geometry has conventionally been known. For example, Japanese Patent Laying-Open No. 2019-180881 discloses a three-dimensional scanner that obtains three-dimensional data of a surface geometry of an object by projecting on the object, light that has passed through a lens while the lens is caused to make reciprocating motion in a linear direction and detecting light reflected at the object.

SUMMARY

The three-dimensional scanner disclosed in Japanese Patent Laying-Open No. 2019-180881 includes a handpiece that can be used as being held with a hand of a user such as an operator. While the three-dimensional scanner is used, the handpiece is inclined at various angles. Therefore, a component in a direction of reciprocating motion, of gravity applied to a lens in the handpiece is varied with variation in angle of inclination of the handpiece, and with such variation, a central position of reciprocating motion of the lens may also be varied. Thus, while the three-dimensional scanner is used, the focal position moves away from or comes closer to a tip end of the handpiece and a depth of field which is a range of a focal position of light that passes through the lens may not be stable. Therefore, the user has to bring the handpiece closer to or move the handpiece away from the object in accordance with the angle of inclination of the handpiece in order to set the focal position of the lens onto a portion of the object which is a target of imaging. Depending on skills of the user, three-dimensional data of the surface geometry of the object may not appropriately be obtained.

The present disclosure was made to solve the problem above, and an object thereof is to provide a technique that enables appropriate obtainment of three-dimensional data of a surface geometry of an object.

A three-dimensional scanner according to the present disclosure is configured to obtain three-dimensional data of a surface geometry of an object with a focus method. The three-dimensional scanner includes a lens, an imaging unit configured to take an image of the object located at a focal position of the lens, a lens driver configured to drive the lens to make reciprocating motion in a linear direction, an angle detector configured to detect variation in angle of inclination of the lens with respect to a prescribed direction, and a lens controller configured to control an operation of the lens with variation in angle of inclination detected by the angle detector.

A control method according to the present disclosure is a method of controlling a three-dimensional scanner configured to obtain three-dimensional data of a surface geometry of an object with a focus method. The control method includes, as processing to be performed by a computer, taking an image of the object located at a focal position of a lens provided in the three-dimensional scanner, driving the lens to make reciprocating motion in a linear direction, detecting variation in angle of inclination of the lens with respect to a prescribed direction, and controlling an operation of the lens with variation in angle of inclination detected in the detecting variation.

The foregoing and other objects, features, aspects and advantages of this disclosure will become more apparent from the following detailed description of this disclosure when taken in conjunction with the accompanying drawings.

DETAILED DESCRIPTION

Embodiment

An embodiment of the present disclosure will be described with reference to the drawings.

[Configuration of Three-Dimensional Scanner]

Figure 1:
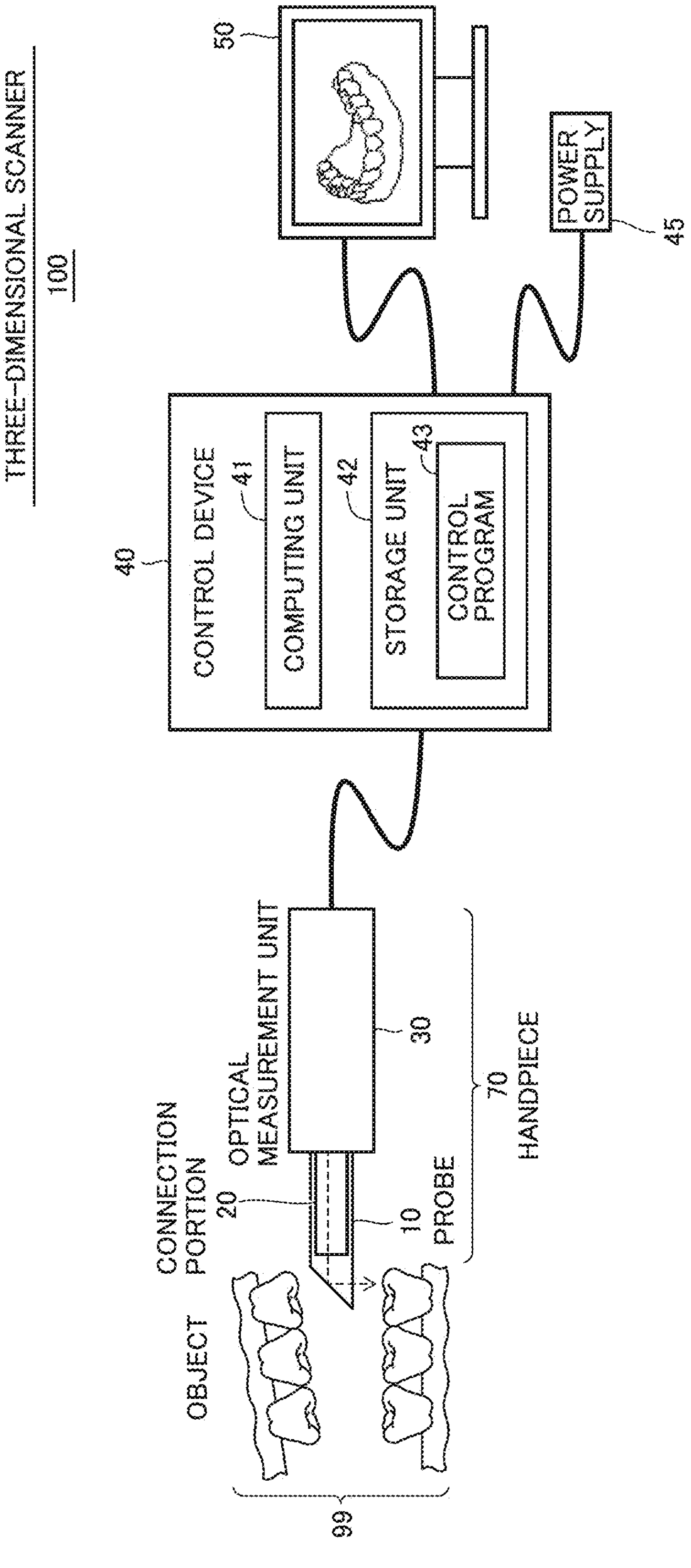
FIG. 1 is a diagram showing a configuration of a three-dimensional scanner according to an embodiment.

FIG. 1 is a diagram showing a configuration of a three-dimensional scanner 100 according to an embodiment. Three-dimensional scanner 100 is an intra oral scanner (IOS) that obtains three-dimensional data of a surface geometry of an object 99 such as a tooth and a soft tissue in a mouth cavity by scanning the surface geometry. The three-dimensional data includes positional information (a coordinate along axes in a vertical direction, a lateral direction, and a height direction) of each point in a group of points (a plurality of points) representing the surface geometry of object 99. Three-dimensional scanner 100 can also obtain color data indicating a color of each point in the group of points (the plurality of points) representing the surface geometry of object 99, together with the three-dimensional data.

Three-dimensional scanner 100 according to the embodiment is applicable also to medical care in every medical department such as an ophthalmology department, an otorhinolaryngology department, a radiology department, internal medicine, surgery, and a veterinary department, without being limited to dentistry. For example, three-dimensional scanner 100 according to the embodiment is not limited to the intra oral scanner but is applicable also to another similarly configured three-dimensional scanner such as a scanner configured to obtain three-dimensional data of a surface geometry of the inside of an outer ear by taking an image of the inside of a human ear other than the inside of the mouth cavity.

Any user of three-dimensional scanner 100, such as an operator including a dentist, a dental nurse, a teacher or a student of a dental college, a dental technician, an engineer of a manufacturer, a worker in a manufacturing factory, and the like, may be applicable so long as the user obtains three-dimensional data of object 99 such as a tooth and a soft tissue with the use of three-dimensional scanner 100. Any subject of scanning by three-dimensional scanner 100, such as a patient at a dentist or a subject in a dental college, may be applicable so long as the subject can be a subject to be scanned by three-dimensional scanner 100.

As shown in FIG. 1, three-dimensional scanner 100 includes a handpiece 70, a control device 40, a display 50, and a power supply 45. Handpiece 70 is a hand-held member, and includes a probe 10, a connection portion 20, and an optical measurement unit 30.

Probe 10 is inserted in the mouth cavity to project light having a pattern (which is simply also referred to as a "pattern" below) onto object 99 such as a tooth and a soft tissue. Probe 10 guides light reflected from object 99 on which the pattern is projected to optical measurement unit 30. Probe 10 is removably attached to connection portion 20 while it covers an outer periphery of a tip end of connection portion 20.

Connection portion 20 is a part of optical measurement unit 30 that protrudes from optical measurement unit 30, and it is in a shape that allows fitting to a root of probe 10. Connection portion 20 includes an optical component such as a lens system for guiding light taken by probe 10 to optical measurement unit 30, a cover glass, an optical filter, and a phase plate (for example, a ¼ wave plate).

Optical measurement unit 30 projects a pattern on object 99 through probe 10 and takes an image of the projected pattern. Optical measurement unit 30 according to the embodiment is configured to obtain a three-dimensional geometry based on principles of the focus method as will be described below.

Control device 40 controls an operation of optical measurement unit 30 and obtains the three-dimensional geometry by processing an image taken by optical measurement unit 30. Control device 40 includes a computing unit 41 and a storage unit 42.

Computing unit 41 is a computing entity (computer) that performs various types of processing by executing various programs. Computing unit 41 is implemented by a processor such as a central processing unit (CPU) or a micro-processing unit (MPU). Though the processor which represents a computing unit 41 performs functions to perform various types of processing by executing a program, some or all of these functions may be performed by dedicated hardware circuitry such as an application specific integrated circuit (ASIC) or a field-programmable gate array (FPGA). The "processor" is not limited to a processor in a narrow sense that performs processing in accordance with a stored program architecture like the CPU or the MPU, but may encompass hard-wired circuitry such as the ASIC or the FPGA. Therefore, the "processor" representing computing unit 41 can also be read as processing circuitry, processing by which is defined in advance by a computer readable code and/or hard-wired circuitry. Computing unit 41 may be implemented by a single chip or a plurality of chips. Furthermore, the processor and relating processing circuitry may be implemented by a plurality of computers connected to one another through wires or wirelessly over a local area network or a wireless network. The processor and the relating processing circuitry may be implemented by a cloud computer that performs remote computation based on input data and outputs a result of computation to another device located at a remote position.

Storage unit 42 includes a memory and a storage device which are not shown. The memory includes a volatile storage area (for example, a working area) where a program code or a work memory is temporarily stored in execution of various programs by computing unit 41. Examples of the memory include a volatile memory such as a dynamic random access memory (DRAM) and a static random access memory (SRAM) or a non-volatile memory such as a read only memory (ROM) and a flash memory. Various programs to be executed by computing unit 41 or various types of data are stored in the storage device. The storage device may be implemented by one or more non-transitory computer readable media or one or more computer readable storage media. Examples of the storage device include a hard disk drive (HDD) and a solid state drive (SSD).

In three-dimensional scanner 100 according to the embodiment, a control program 43 to be executed by computing unit 41 is stored in storage unit 42. Computing unit 41 performs processing involved with amplitude control for controlling reciprocating linear motion of a lens 81 by executing control program 43. Details of amplitude control will be described later.

Control device 40 can also output obtained three-dimensional data to display 50 or receive input of information such as setting of optical measurement unit 30 through a not-shown input device or the like.

Though control device 40 is configured separately from handpiece 70 in three-dimensional scanner 100 according to the embodiment, at least one or all of functions of computing unit 41 and storage unit 42 of control device 40 may be performed by handpiece 70 so long as control device 40 is sufficiently small in size and light in weight to such an extent as being lifted by one hand.

Though each constituent element (30, 40, 45, or 50) of three-dimensional scanner 100 is drawn as being routed through a cable (a bold line in the figure) in the example in FIG. 1, a part or the entirety of such routing may be established by connection by wireless communication.

Display 50 shows a three-dimensional geometry of object 99 represented by three-dimensional data obtained by control device 40. Display 50 can also show other information such as setting information of optical measurement unit 30, patient information, a scanner activation state, an operation manual, and a help screen. For example, a stationary liquid crystal display, a wearable device of a head-mounted type or a glass type, or the like may be applicable as display 50. Three-dimensional scanner 100 may include a plurality of displays 50, and the three-dimensional geometry of object 99 and other information may be shown on the plurality of displays 50 simultaneously or in a split manner.

Power supply 45 supplies electric power to optical measurement unit 30 and control device 40. Though power supply 45 may be provided outside control device 40 as shown in FIG. 1, it may be provided in the inside of control device 40 or the inside of handpiece 70. A plurality of power supplies 45 may be provided to individually feed power to control device 40, optical measurement unit 30, and display 50.

[Configuration of Handpiece]

Figure 2:
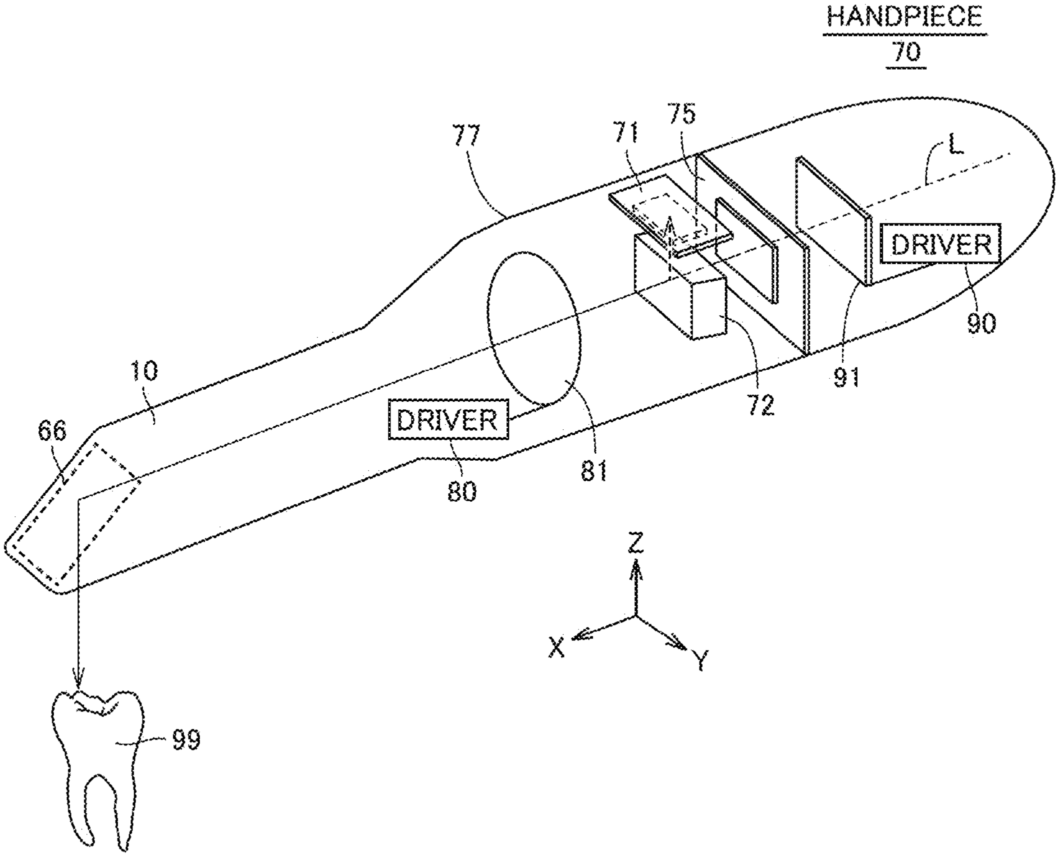
FIG. 2 is a diagram showing a configuration of a handpiece according to the embodiment.
Figure 3:
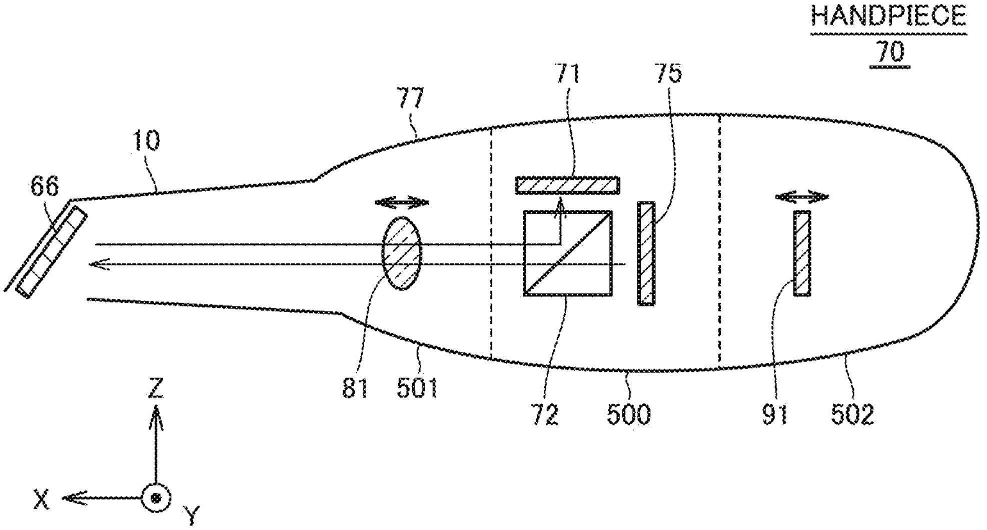
FIG. 3 is a diagram showing an X-Z cross-section of the handpiece according to the embodiment.

FIG. 2 is a diagram showing a configuration of handpiece 70 according to the embodiment. FIG. 3 is a diagram showing an X-Z cross-section of handpiece 70 according to the embodiment. Each member in handpiece 70 shown in FIGS. 2 and 3 is accommodated in optical measurement unit 30 shown in FIG. 1.

As shown in FIGS. 2 and 3, handpiece 70 includes a projection light generator 75, lens 81, an optical sensor 71, and a prism 72 in the inside of a hand-held housing 77. Optical sensor 71 can be an "imaging unit." In addition thereto, handpiece 70 may include a reflector that reflects light toward object 99. In the embodiment, for the sake of convenience of description, a virtual straight line representing a direction of reciprocating linear motion of lens 81 is denoted as L, and an axis in parallel to straight line L is referred to as an X axis, an upward axis perpendicular to straight line L on the sheet plane in FIG. 2 is referred to as a Z axis, and an axis perpendicular to each of the X axis and the Z axis is referred to as a Y axis.

Projection light generator 75 is implemented by a laser element or a light emitting diode (LED) that serves as a light source. Light from projection light generator 75 passes through prism 72 and lens 81 via a projection pattern screen (not shown) that is arranged in front of projection light generator 75 and generates a projection pattern, and is emitted to object 99 through a reflection portion 66 provided in probe 10 and reflected by object 99. Light reflected at object 99 passes again through lens 81 via reflection portion 66 and enters prism 72. Prism 72 changes a direction of travel of light from object 99 to a direction in which optical sensor 71 is located (in this example, a Z-axis direction). Light the direction of travel of which is changed by prism 72 is detected by optical sensor 71. Though light from projection light generator 75 and light reflected at object 99 and guided to prism 72 are shown separately from each other in the example shown in FIG. 3, this representation is for the sake of description for facilitated understanding, and actually, handpiece 70 is configured such that both of them are coaxially guided.

In an example where a three-dimensional geometry is obtained by using the technique of the focus method, light that passes through a pattern generation element (not shown) provided between lens 81 and object 99 is projected on object 99. As lens 81 makes reciprocating linear motion along the same straight line (for example, straight line L as illustrated), a focal position of the projection pattern is varied. Optical sensor 71 takes an image of object 99 present at the focal position of the projection pattern by detecting light from object 99 at a prescribed frame rate each time the focal position of the projection pattern is varied, under the control by control device 40. Since control device 40 can change the frame rate by changing a shutter speed of optical sensor 71, it performs a function as a "frame rate controller." Control device 40 obtains three-dimensional data of the surface geometry of object 99 by computing geometrical information of object 99 based on a position of lens 81 and a result of detection by optical sensor 71 at that time.

Lens 81 is driven by a lens driver 80 and makes reciprocating linear motion. When lens 81 makes reciprocating linear motion in a direction shown with straight line L (an X-axis direction), a position of the center of gravity of handpiece 70 moves by a mass of lens 81, which is transmitted as vibration to a user's hand with which handpiece 70 is held. In order to cancel vibration, handpiece 70 further includes a counterweight 91 in the inside of housing 77. Counterweight 91 is driven by a counterweight driver 90 and makes reciprocating linear motion in a direction opposite to reciprocating motion of lens 81.

Counterweight 91 is provided on a rear surface side of projection light generator 75 in the X-axis direction so as not to cut off an optical path between object 99 and lens 81 and an optical path between lens 81 and optical sensor 71.

Specifically, as shown in FIG. 3, handpiece 70 is provided with a first accommodation portion 501 located in a front portion of handpiece 70 and a second accommodation portion 502 located in a rear portion of handpiece 70 in housing 77. Lens 81 is accommodated in first accommodation portion 501 and counterweight 91 is accommodated in second accommodation portion 502. Handpiece 70 is further provided with a coupling accommodation portion 500 between first accommodation portion 501 and second accommodation portion 502, coupling accommodation portion 500 coupling lens 81 held in first accommodation portion 501 and counterweight 91 held in second accommodation portion 502 to each other. Optical sensor 71, prism 72, and projection light generator 75 described above are accommodated in coupling accommodation portion 500.

Figure 4:
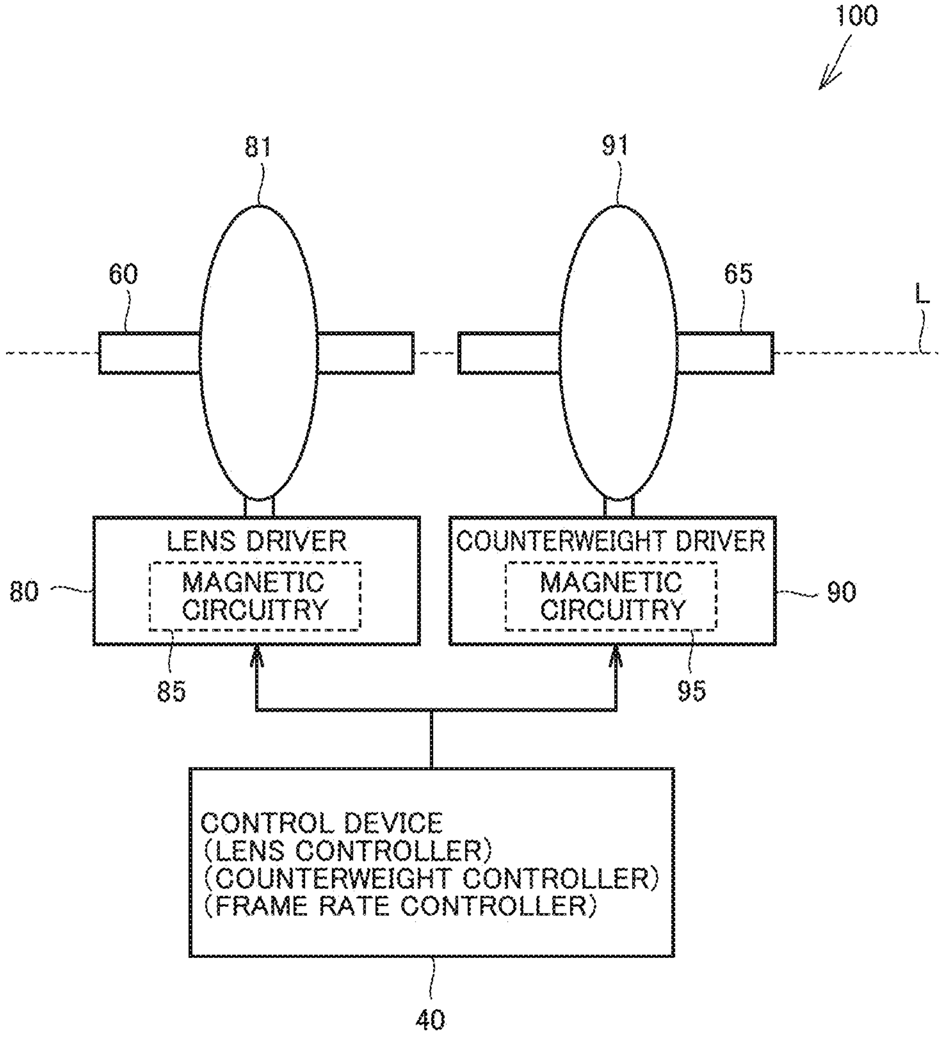
FIG. 4 is a diagram for illustrating positional relation between a lens and a counterweight in the three-dimensional scanner according to the embodiment.

FIG. 4 is a diagram for illustrating positional relation between lens 81 and counterweight 91 in three-dimensional scanner 100 according to the embodiment. An example shown in FIG. 4 does not show housing 77. As shown in FIG. 4, lens 81 is supported by a linear guide 60 in parallel to straight line L to make reciprocating linear motion in the direction of straight line L.

Furthermore, lens driver 80 causes lens 81 held by a mover to make reciprocating linear motion in the direction of straight line L by means of magnetic circuitry 85. In other words, lens driver 80 is implemented by a linear motor.

Counterweight 91 is a weight provided on straight line L in a direction of the linear motion of lens 81, the weight being equal in mass to lens 81. Counterweight 91 is supported by a linear guide 65 in parallel to straight line L to make reciprocating linear motion in the direction of straight line L. Though linear guide 60 and linear guide 65 are different members in the embodiment, linear guide 60 and linear guide 65 may be formed from one continuous member.

Counterweight driver 90 causes counterweight 91 held by a mover to make reciprocating linear motion in the direction of straight line L by means of magnetic circuitry 95. In other words, counterweight driver 90 is implemented by a linear motor.

A specific configuration of lens driver 80 and counterweight driver 90 each implemented by the linear motor will be described later. Lens driver 80 and counterweight driver 90 are also simply collectively referred to as a "linear motor" below. Each of lens driver 80 and counterweight driver 90 is controlled by control device 40. Control device 40 can be a "lens controller" and a "counterweight controller." Though lens driver 80 and counterweight driver 90 are controlled by control device 40 in common in the embodiment, lens driver 80 and counterweight driver 90 may be controlled by control devices different from each other.

When lens driver 80 causes lens 81 to make reciprocating linear motion in the direction of straight line L which defines an optical axis, counterweight driver 90 causes counterweight 91 to make reciprocating linear motion in a direction opposite to reciprocating motion of lens 81 by a distance as long as the distance of reciprocating linear motion of lens 81. For example, when lens 81 moves along straight line L by 10 mm in a direction toward object 99, counterweight 91 moves along straight line L by 10 mm in a direction away from object 99. When lens 81 moves along straight line L by 15 mm in the direction away from object 99, counterweight 91 moves along straight line L by 15 mm in the direction toward object 99.

As counterweight 91 thus makes reciprocating linear motion in the direction opposite to reciprocating motion of lens 81 by the distance as long as the distance of reciprocating linear motion of lens 81, imbalance in center of gravity of handpiece 70 due to reciprocating linear motion of lens 81 can be canceled. Counterweight 91 can thus cancel vibration caused by reciprocating linear motion of lens 81.

[Configuration of Linear Motor]

Figure 5:
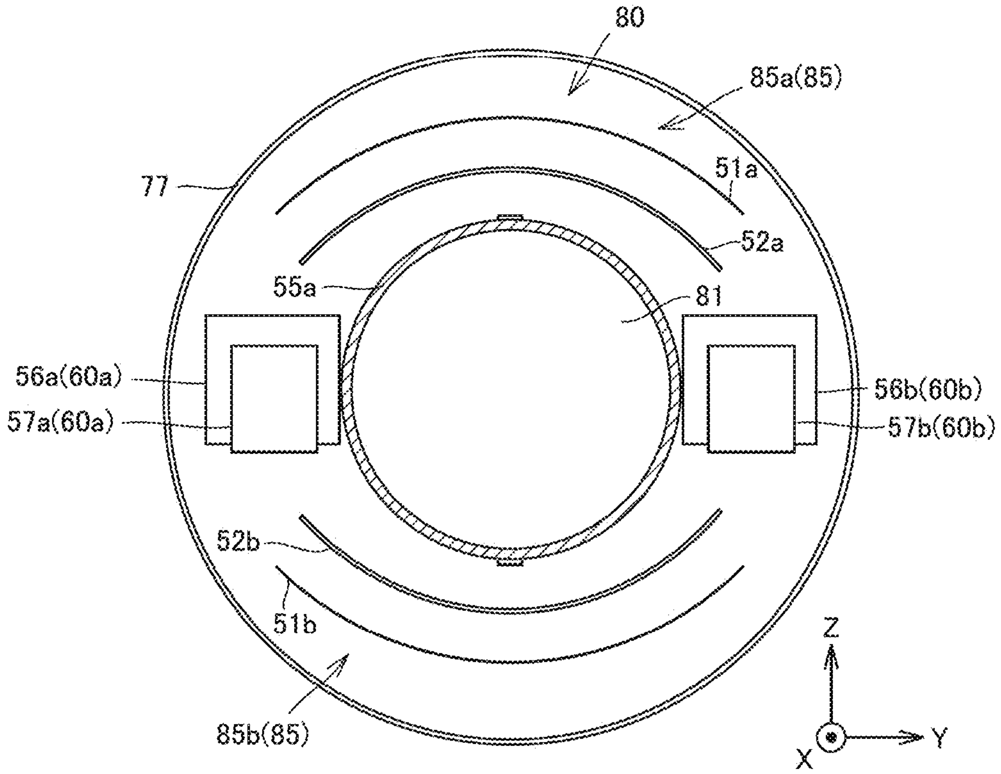
FIG. 5 is a diagram showing a Y-Z cross-section of a linear motor according to the embodiment.
Figure 6:
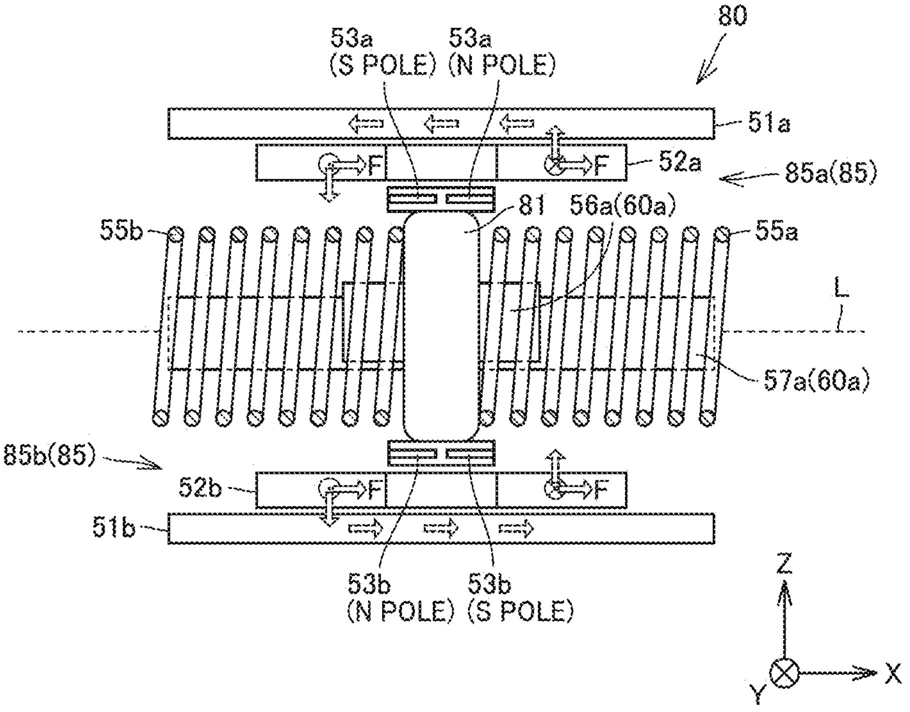
FIG. 6 is a diagram showing an X-Z cross-section of the linear motor according to the embodiment.

FIG. 5 is a diagram showing a Y-Z cross-section of the linear motor according to the embodiment. FIG. 6 is a diagram showing an X-Z cross-section of the linear motor according to the embodiment. In the example shown in FIGS. 5 and 6, of the linear motors, the configuration of lens driver 80 will be described. Counterweight driver 90 is also similar in configuration to lens driver 80. Specifically, in the case of counterweight driver 90, in the example shown in FIGS. 5 and 6, lens 81 is replaced with counterweight 91 but the counterweight driver is otherwise similar in configuration to lens driver 80.

As shown in FIGS. 5 and 6, in lens driver 80, in order to provide lens 81 substantially in a circular shape in a central portion, members for allowing lens 81 to make reciprocating linear motion are arranged around lens 81, and lens driver 80 is in an elongated hollow shape along straight line L which represents the direction of linear motion. Since the configuration is such that substantially circular lens 81 is provided in the central portion of lens driver 80, light can pass through the central portion of lens driver 80.

Specifically, as shown in FIG. 5, in lens driver 80, a linear guide 60*a* composed of a rail 57*a* and a block 56*a* and a linear guide 60*b* composed of a rail 57*b* and a block 56*b* are provided in an outer circumferential portion of lens 81. A plurality of linear guides 60*a* and 60*b* are thus arranged at positions different from each other on an outer circumferential side of lens 81.

More specifically, the plurality of linear guides 60*a* and 60*b* are arranged in parallel to each other at positions in rotation symmetry, with the optical axis (straight line L) that is in parallel to the direction of linear motion of lens 81 and passes through the center of lens 81 being defined as a rotation axis. For example, when each of the plurality of linear guides 60*a* and 60*b* is turned by 180 degrees with straight line L being defined as the rotation axis in FIG. 5, linear guide 60*a* is arranged at the position of linear guide 60*b* and linear guide 60*b* is arranged at the position of linear guide 60*a*. Though not shown, a plurality of linear guides 65 are arranged also at similar positions. In other words, the plurality of linear guides 65 are arranged in parallel to each other at positions in rotation symmetry with an axis (straight line L) that is in parallel to the direction of linear motion of counterweight 91 and passes through the center of counterweight 91 being defined as a rotation axis.

Block 56*a* of linear guide 60*a* supports lens 81 and is fitted to rail 57*a*, and causes lens 81 to make reciprocating linear motion by moving in the linear direction along rail 57*a*. Block 56*b* of linear guide 60*b* supports lens 81 at a position different from block 56*a* and is fitted to rail 57*b*, and causes lens 81 to make reciprocating linear motion by moving in the linear direction along rail 57*b*. Linear guides 60*a* and 60*b* correspond to linear guide 60 described with reference to FIG. 4.

Furthermore, as shown in FIG. 6, a spring 55*a* and a spring 55*b* as elastic members are provided along an outer circumference of lens 81 to surround the outer circumference of lens 81 but not to cut off an optical path in the central portion of lens 81. A coil spring or the like is applied as spring 55*a* and spring 55*b*. Without being limited to the spring, any member such as rubber may be applicable as the elastic member so long as the member deforms when force is applied thereto whereas it returns to the original state when force is removed.

Spring 55*a* and spring 55*b* have one ends abutting on lens 81 and the other ends fixed in housing 77. Furthermore, spring 55*a* and spring 55*b* are held in housing 77 such that deformation thereof in an X direction is permitted and they are less likely to deform in a Y-Z direction. Spring 55*a* and spring 55*b* thus arranged apply elastic force to lens 81 in the direction of linear motion. Spring 55*a* and spring 55*b* may substantially be equal in diameter to lens 81 so as to be able to fix lens 81 by sandwiching the same therebetween.

On an outer side (a side away from the center of lens 81 in a Z direction) of spring 55*a* and spring 55*b*, magnetic circuitry 85*a* for reciprocating linear motion of lens 81 in the direction of straight line L is provided. Magnetic circuitry 85*a* includes a magnet 53*a* composed of the N pole and the S pole and a coil 52*a* arranged on the outer side (the side away from the center of lens 81 in the Z direction) of magnet 53*a*.

Magnet 53*a* is a mover that can be moved in the direction of straight line L. As magnet 53*a* makes reciprocating linear motion in the X direction along straight line L, lens 81 can also make reciprocating linear motion in the X direction along straight line L. Coil 52*a* is a stator.

A yoke 51*a* is provided on the further outer side (the side away from the center of lens 81 in the Z direction) of coil 52*a*. Yoke 51*a* is a stator similarly to coil 52*a*.

On a side opposite to magnetic circuitry 85*a* with lens 81 being interposed, magnetic circuitry 85*b* for reciprocating linear motion of lens 81 in the direction of straight line L is provided. Magnetic circuitry 85*b* includes a magnet 53*b* composed of the N pole and the S pole and a coil 52*b* arranged on the outer side (the side away from the center of lens 81 in the Z direction) of magnet 53*b*.

Magnet 53*b* is a mover that can be moved in the direction of straight line L. As magnet 53*b* makes reciprocating linear motion in the X direction along straight line L, lens 81 can also make reciprocating linear motion in the X direction along straight line L. Coil 52*b* is a stator.

A yoke 51*b* is provided on the further outer side of coil 52*b*. Yoke 51*b* is a stator similarly to coil 52*b*. Furthermore, yoke 51*a* and yoke 51*b* which are stators are fixed as appropriate to housing 77 of handpiece 70.

In lens driver 80 configured as such, as magnetic circuitry 85*a* and magnetic circuitry 85*b* apply force to lens 81 in the direction of straight line L, lens 81 makes reciprocating linear motion.

For example, when magnet 53*a* and magnet 53*b* each composed of the N pole and the S pole are arranged in positional relation as shown in FIG. 6 in magnetic circuitry 85*a* and magnetic circuitry 85*b*, magnetic field in a direction as shown with a dotted arrow is produced. In this case, when a drive current (a current in a direction from the front toward the rear on the sheet plane along the Y axis being expressed with "x" and a current in a direction from the rear toward the front on the sheet plane along the Y axis being expressed with ".") as shown in FIG. 6 is fed to coil 52*a* and coil 52*b*, electromagnetic force (F) is produced in the X-axis direction as shown with a solid arrow in accordance with the Fleming's left-hand rule. As electromagnetic force (F) thus produced is applied to magnet 53*a* and magnet 53*b* which are the movers, magnet 53*a* and magnet 53*b* are moved in a direction opposite to electromagnetic force (F). Components relating to motion of an object in an apparatus, such as springs 55*a* and 55*b*, magnets 53*a* and 53*b*, lens 81, coils 52*a* and 52*b*, and a damper containing a viscous lubricant such as grease, are also referred to as a "kinetic system" below.

Lens 81 vibrates in the direction of straight line L as a result of response by the kinetic system, such as inertial force of lens 81, electromagnetic force (F), elastic force of springs 55*a* and 55*b*, and viscous force of the damper. Using this vibration, control device 40 causes lens 81 to make reciprocating linear motion in the direction of straight line L. In other words, control device 40 controls lens driver 80 in constant cycles in accordance with a natural frequency of the kinetic system to feed the drive current to magnetic circuitry 85*a* and magnetic circuitry 85*b*, so that lens 81 can make reciprocating linear motion in the direction of straight line L based on a phenomenon of resonance by the kinetic system. Since the drive current is in proportion to an amount of displacement in reciprocating linear motion of lens 81, control device 40 can vary the amount of displacement in reciprocating linear motion of lens 81 by varying the drive current. For example, as control device 40 increases the drive current, the amount of displacement in reciprocating linear motion of lens 81 can increase, and as control device 40 decreases the drive current, the amount of displacement in reciprocating linear motion of lens 81 can decrease.

As the drive current is thus fed to coil 52*a* and coil 52*b* in accordance with the natural frequency of the kinetic system, lens driver 80 can function as a resonant drive motor that drives lens 81 to move back and forth in the direction of straight line L. In an example where lens 81 is caused to make reciprocating linear motion by a mechanical arrangement in which a mechanical component such as a cam is connected to a motor, the motor should constantly be kept driven while lens 81 is moved. By using the phenomenon of resonance of the kinetic system as in the embodiment, on the other hand, lens 81 can be caused to make reciprocating linear motion simply by feed of the drive current in magnetic circuitry 85*a* and magnetic circuitry 85*b* in constant cycles. Therefore, use of magnetic circuitry 85 as in the embodiment can achieve suppression of power consumption and efficiency. Furthermore, in the case of a cam mechanism, contact noise may be generated by the cam mechanism, or powders resulting from contact may be produced from a cam surface due to deterioration of a cam mechanism portion. By using the phenomenon of resonance of the kinetic system as in the embodiment, such a disadvantage can also be overcome.

As described previously, when lens driver 80 causes lens 81 to make reciprocating linear motion in the direction of straight line L, counterweight driver 90 causes counterweight 91 to make reciprocating linear motion in the direction opposite to reciprocating motion of lens 81 by the distance the same as the distance of motion of lens 81. Lens 81 makes reciprocating linear motion along straight line L, whereas counterweight 91 makes reciprocating linear motion along straight line L in the direction opposite to reciprocating motion of the direction of linear motion of lens 81 in order to cancel imbalance of the center of gravity. The user thus does not feel vibration even when the user uses handpiece 70 by holding the same in his/her hand.

Comparative Example

As described above, three-dimensional scanner 100 is configured to vary a focal position of light that passes through lens 81 by causing lens 81 contained in handpiece 70 to make reciprocating linear motion and to take an image of object 99 present at the focal position of light. The focal position of light that passes through lens 81 is dependent on a range of movement of lens 81 that makes reciprocating linear motion.

While three-dimensional scanner 100 is used, handpiece 70 is inclined in various directions and at various angles. Therefore, a component in the direction of reciprocating motion (the direction of straight line L), of gravity applied to lens 81 is varied with variation in angle of inclination of handpiece 70, that is, angle of inclination of lens 81 in handpiece 70. For example, when handpiece 70 is in a horizontal state, the component in the direction of reciprocating motion, of gravity applied to lens 81 is zero. As a tip end of handpiece 70 (a tip end of probe 10) is inclined more in the vertical direction, the component in the direction of reciprocating motion, of gravity applied to lens 81 increases. When the tip end of handpiece 70 (the tip end of probe 10) points to the vertical direction, the entirety of gravity applied to lens 81 defines the component in the direction of reciprocating motion.

When the component in the direction of reciprocating motion, of gravity applied to lens 81 is thus varied with variation in angle of inclination of lens 81, accordingly, a central position of reciprocating motion of lens 81 may also be varied. For example, as the tip end of handpiece 70 is inclined more in the vertical direction, the central position of reciprocating motion of lens 81 moves toward the tip end of handpiece 70. Thus, while three-dimensional scanner 100 is used, the focal position of light that passes through lens 81 moves away from or comes closer to the tip end of handpiece 70 and a depth of field which refers to a range of the focal position may not be stable.

Figure 7:
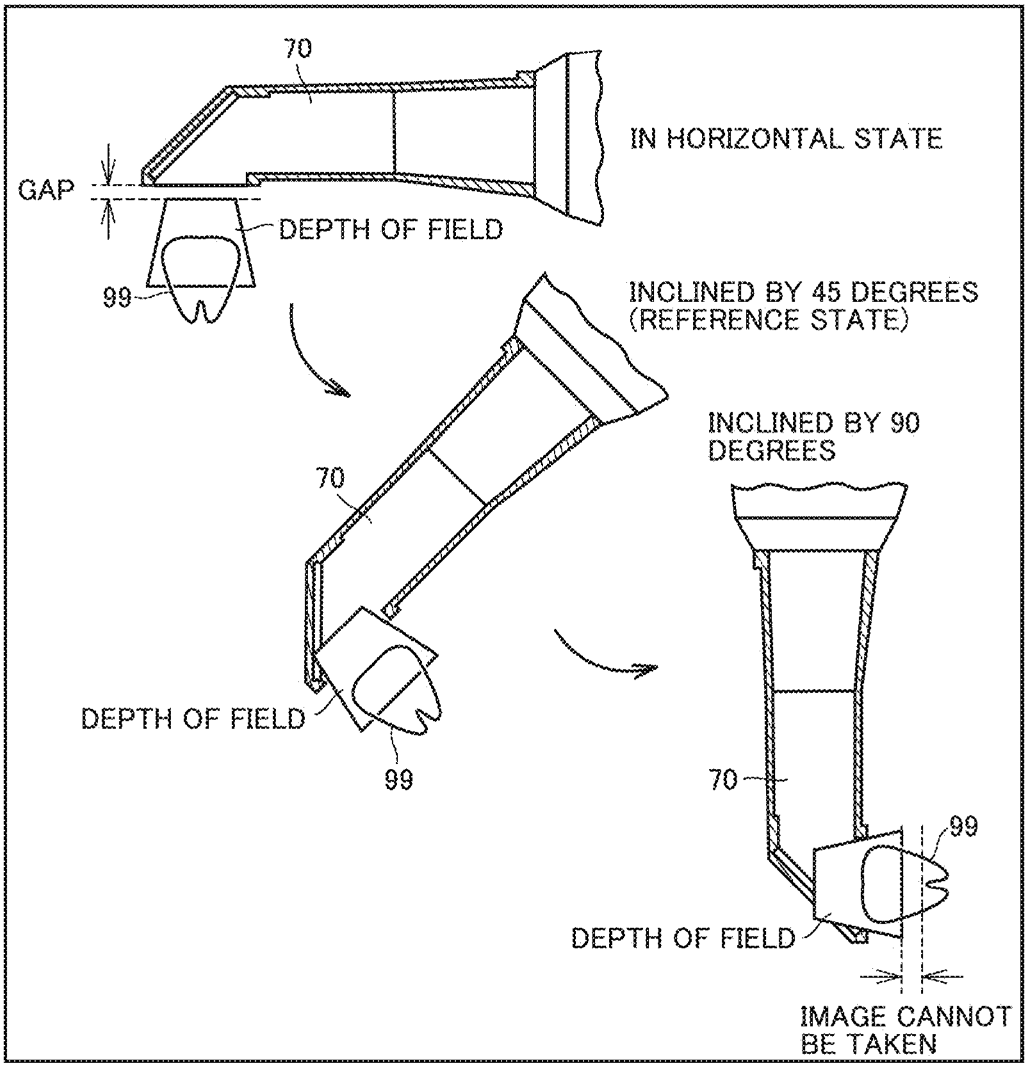
FIG. 7 is a diagram showing a depth of field in accordance with an angle of inclination of the handpiece according to a comparative example.

For example, FIG. 7 is a diagram showing the depth of field in accordance with the angle of inclination of handpiece 70 according to the comparative example. As shown in FIG. 7, an example in which the depth of field is designed with inclination of handpiece 70 in the vertical direction by 45 degrees from a horizontal direction being defined as a reference state is assumed.

When handpiece 70 is in the horizontal state, the focal position of lens 81 is more distant from the tip end of handpiece 70 than in the case of inclination of handpiece 70 by 45 degrees. Specifically, since the depth of field when handpiece 70 is in the horizontal state is more distant from the tip end of handpiece 70 than the depth of field in inclination of handpiece 70 by 45 degrees, there may be a gap between the tip end of handpiece 70 and the depth of field. Therefore, when handpiece 70 is in the horizontal state, the user should scan the surface geometry of object 99 by setting the tip end of handpiece 70 to be more distant from object 99 than in inclination of handpiece 70 by 45 degrees (reference state) in order to set the focal position of lens 81 on a portion of the object which is a target of imaging. For example, when handpiece 70 is in the horizontal state, the user should scan the surface geometry of object 99 by holding handpiece 70 such that the tip end thereof is located slightly above object 99, and it is difficult to appropriately move handpiece 70 along object 99.

When handpiece 70 is inclined in the vertical direction, the focal position of lens 81 comes closer to the tip end of handpiece 70 than in inclination of handpiece 70 by 45 degrees. Specifically, since the depth of field when handpiece 70 is inclined in the vertical direction is closer to the tip end of handpiece 70 than the depth of field in inclination of handpiece 70 by 45 degrees, a part of object 99 (for example, a lower portion of object 99) which is a target of imaging by the user may not be included in the depth of field. Therefore, when handpiece 70 is inclined in the vertical direction, the user should scan the surface geometry of object 99 by bringing the tip end of handpiece 70 closer to object 99 than in inclination of handpiece 70 by 45 degrees (reference state) in order to set the focal position of lens 81 on the portion of the object which is the target of imaging. If handpiece 70 is inclined in the vertical direction while the user is scanning the object with handpiece 70 being inclined by 45 degrees (reference state) and with the tip end of handpiece 70 being in contact with object 99, the tip end of handpiece 70 cannot be brought closer to object 99 any more, and hence an image of the surface geometry of a part of object 99 (for example, the lower portion of object 99) cannot be taken.

The user thus has to bring handpiece 70 closer to object 99 or move handpiece 70 away from the object in accordance with the angle of inclination of handpiece 70 in order to set the focal position of lens 81 on the portion of object 99 which is the target of imaging. Depending on the skills of the user, three-dimensional data of the surface geometry of object 99 may not appropriately be obtained. As described below, three-dimensional scanner 100 according to the embodiment is configured to control an operation of lens 81 in accordance with variation in angle of inclination of handpiece 70, that is, angle of inclination of lens 81, to set the focal position of lens 81 on object 99 regardless of the angle of inclination of lens 81.

[Detection of Variation in Angle of Inclination]

Figure 8:
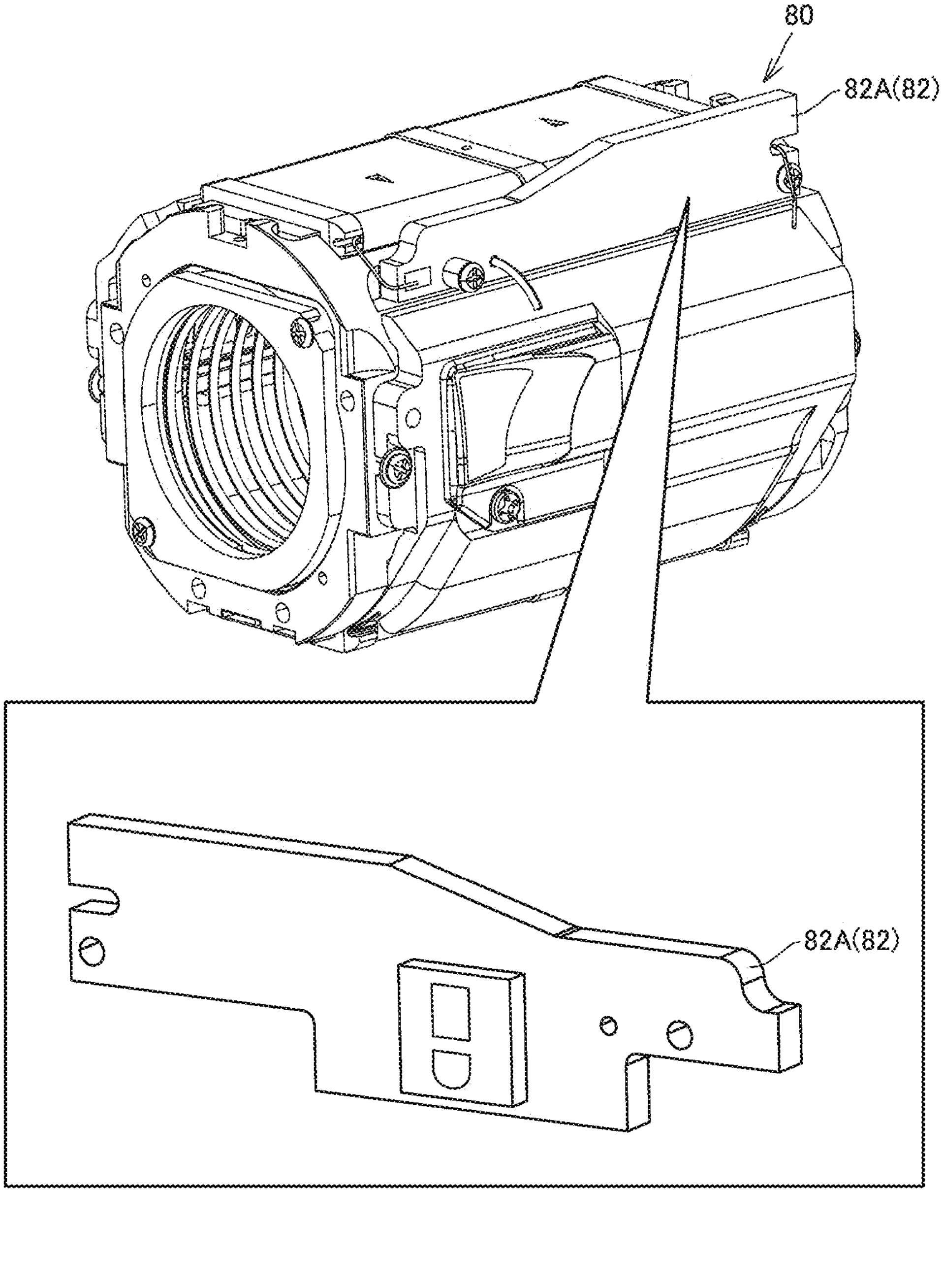
FIGS. 8 and 9 are each a diagram showing an encoder included in the three-dimensional scanner according to the embodiment.
Figure 9:
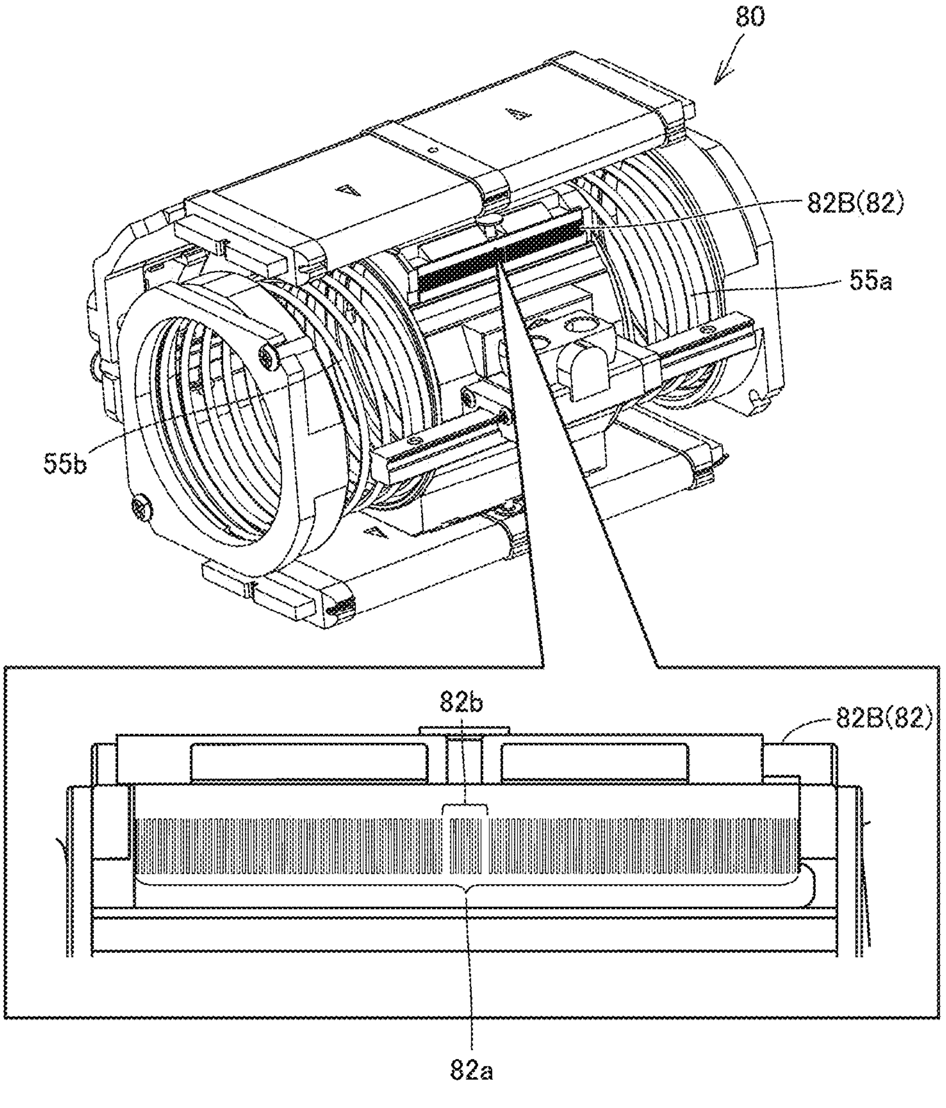

Detection of variation in angle of inclination of lens 81 by control device 40 will be described with reference to FIGS. 8 to 13. FIGS. 8 and 9 are each a diagram showing an encoder 82 included in three-dimensional scanner 100 according to the embodiment. Encoder 82 is a "position detector" that detects a position of lens 81, that is, a focal position of lens 81, and it can also be used as an "angle detector" that allows control device 40 to detect variation in angle of inclination of handpiece 70 with respect to a prescribed direction with a method which will be described later. Though a direction inclined in the vertical direction by 45 degrees from the horizontal direction is applied as the prescribed direction in three-dimensional scanner 100 according to the embodiment, the horizontal direction or the like may be determined as the prescribed direction in advance by a designer of three-dimensional scanner 100.

FIGS. 8 and 9 illustrate an incremental encoder as encoder 82. Encoder 82 includes a detector 82A shown in FIG. 8 and a movement portion 82B shown in FIG. 9. Movement portion 82B includes a scale portion 82*a* and an index portion 82*b*.

Movement portion 82B is supported at opposing ends by spring 55*a* and spring 55*b*, together with lens 81. When lens 81 is in the horizontal state, index portion 82*b* of movement portion 82B makes reciprocating motion together with lens 81, with a predetermined encoder reference position being defined as the center. When lens 81 is inclined from the horizontal state, the component in the direction of reciprocating motion, of gravity applied to lens 81 is varied, which moves the central position of reciprocating motion of index portion 82*b* away from the encoder reference position.

Detector 82A detects a distance (an amount of displacement of lens 81) by which the central position of reciprocating motion of index portion 82*b* has moved away from the encoder reference position, with scale portion 82*a* serving as a lead. Control device 40 can detect variation in angle of inclination of lens 81 with respect to the prescribed direction by obtaining a detection value of scale portion 82*a* and converting the obtained detection value to the angle of inclination of lens 81 with respect to the prescribed direction.

The "angle detector" may be implemented by an absolute encoder or a motion sensor such as a geomagnetic sensor, a gyro sensor, or an acceleration sensor, without being limited to the incremental encoder.

Figure 10:
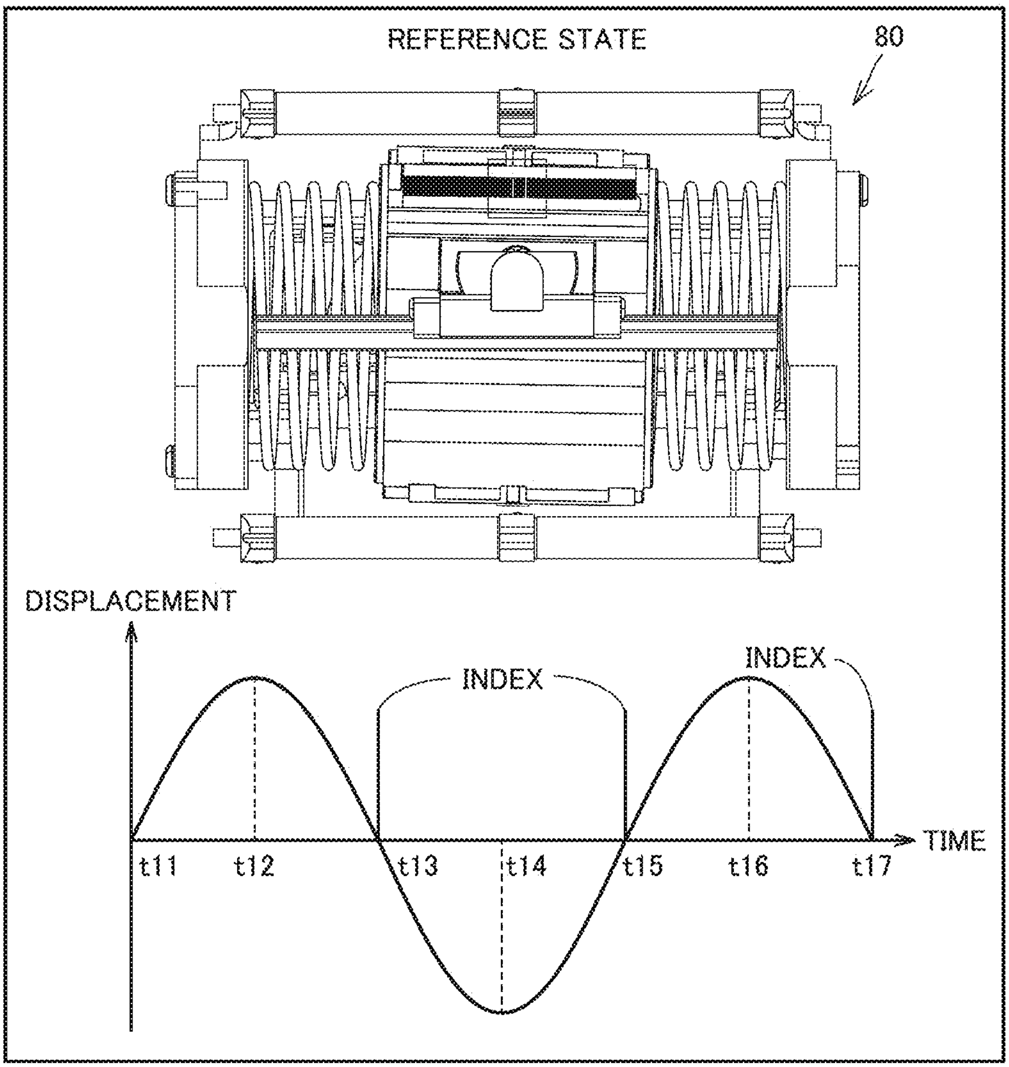
FIGS. 10 and 11 are each a diagram for illustrating reciprocating motion of the lens when the handpiece according to the embodiment is in a reference state.
Figure 11:
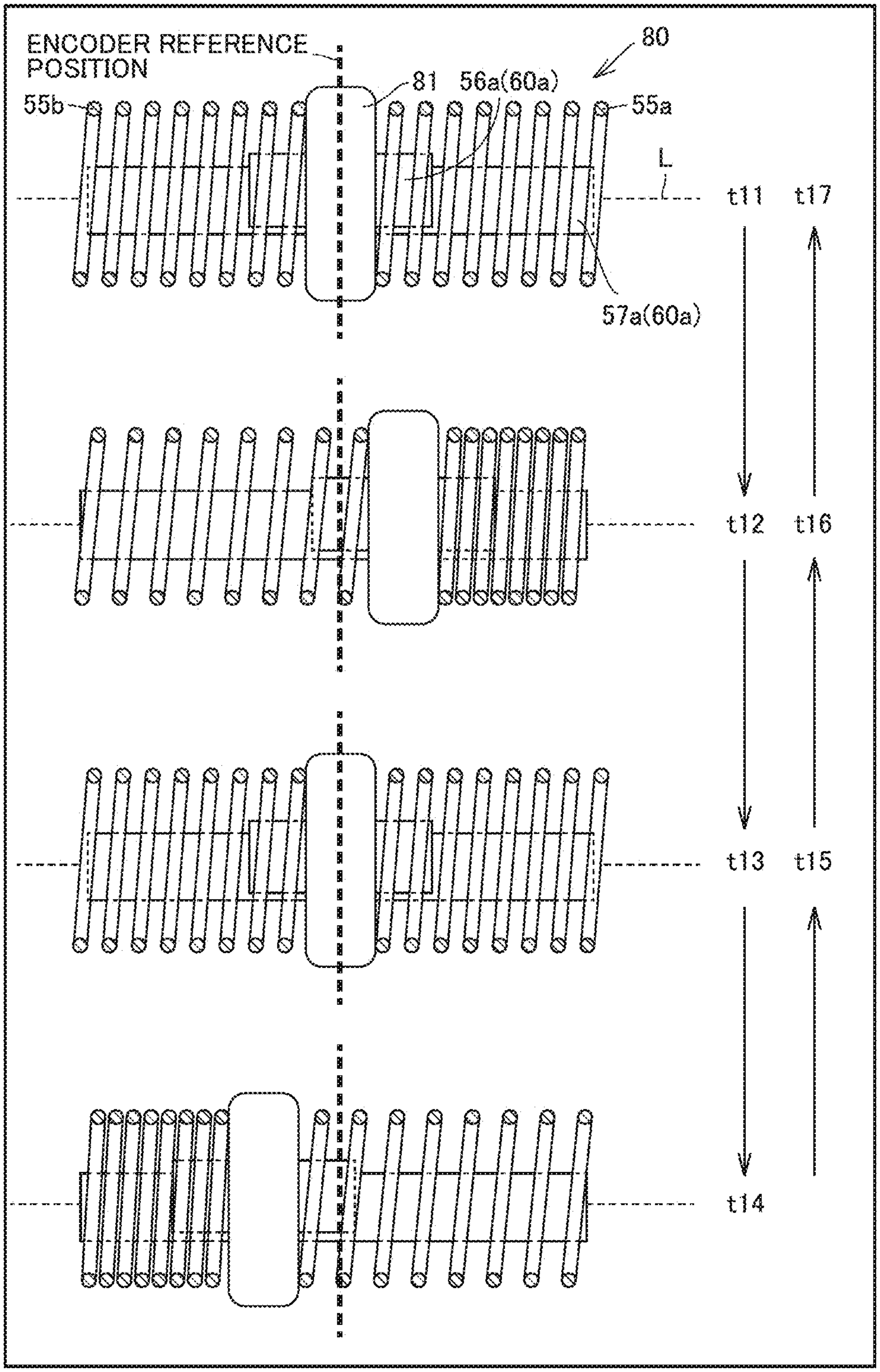

Reciprocating motion of lens 81 with handpiece 70 being in the reference state will be described with reference to FIGS. 10 and 11. As shown in FIG. 7, the "reference state" refers to a state of inclination of handpiece 70 (that is, lens 81) in the vertical direction by 45 degrees from the horizontal direction, however, it may refer to another state such as the horizontal state. FIGS. 10 and 11 are each a diagram for illustrating reciprocating motion of lens 81 when handpiece 70 according to the embodiment is in the reference state.

FIG. 10 shows a graph in which the abscissa represents time and the ordinate represents an amount of displacement of lens 81. Specifically, in the graph in FIG. 10, at each timing (t11 to t17) that comes with lapse of time, the amount of displacement of lens 81 in movement in a first direction (for example, to the right on the sheet plane) is plotted on a positive side, whereas the amount of displacement of lens 81 in movement in a second direction (for example, to the left on the sheet plane) opposite to the first direction is plotted on a negative side.

For example, as shown in FIGS. 10 and 11, an example in which lens 81 moves and makes reciprocating linear motion with handpiece 70 being in the reference state is assumed. At t11, lens 81 moves in the first direction (to the right on the sheet plane) from the central position of reciprocating motion. At t12, lens 81 moves in the first direction (to the right on the sheet plane) to its maximum. Thereafter, owing to elastic force of spring 55*a*, lens 81 returns in the second direction (to the left on the sheet plane). At t13, lens 81 passes through the central position of reciprocating motion, and at t14, lens 81 moves in the second direction (to the left on the sheet plane) to its maximum. Thereafter, owing to elastic force of spring 55*b*, lens 81 returns in the first direction (to the right on the sheet plane). At t15, lens 81 passes through the central position of reciprocating motion, and at t16, lens 81 moves in the first direction (to the right on the sheet plane) to its maximum. Thereafter, owing to elastic force of spring 55*a*, at t17, lens 81 returns to the central position of reciprocating motion.

During reciprocating motion of lens 81 as described above, encoder 82 detects index portion 82*b* being located at the encoder reference position and detects variation in angle of inclination of lens 81 with respect to the prescribed direction. In the example in FIGS. 10 and 11, encoder 82 detects index portion 82*b* being located at the encoder reference position at the timing (t11, t13, t15, and t17) when the amount of displacement of lens 81 is zero, that is, when lens 81 is located at the central position of reciprocating motion. Therefore, control device 40 can detect the angle of inclination of lens 81 with respect to the prescribed direction being zero, that is, inclination of lens 81 in the vertical direction by 45 degrees from the horizontal direction.

Figure 12:
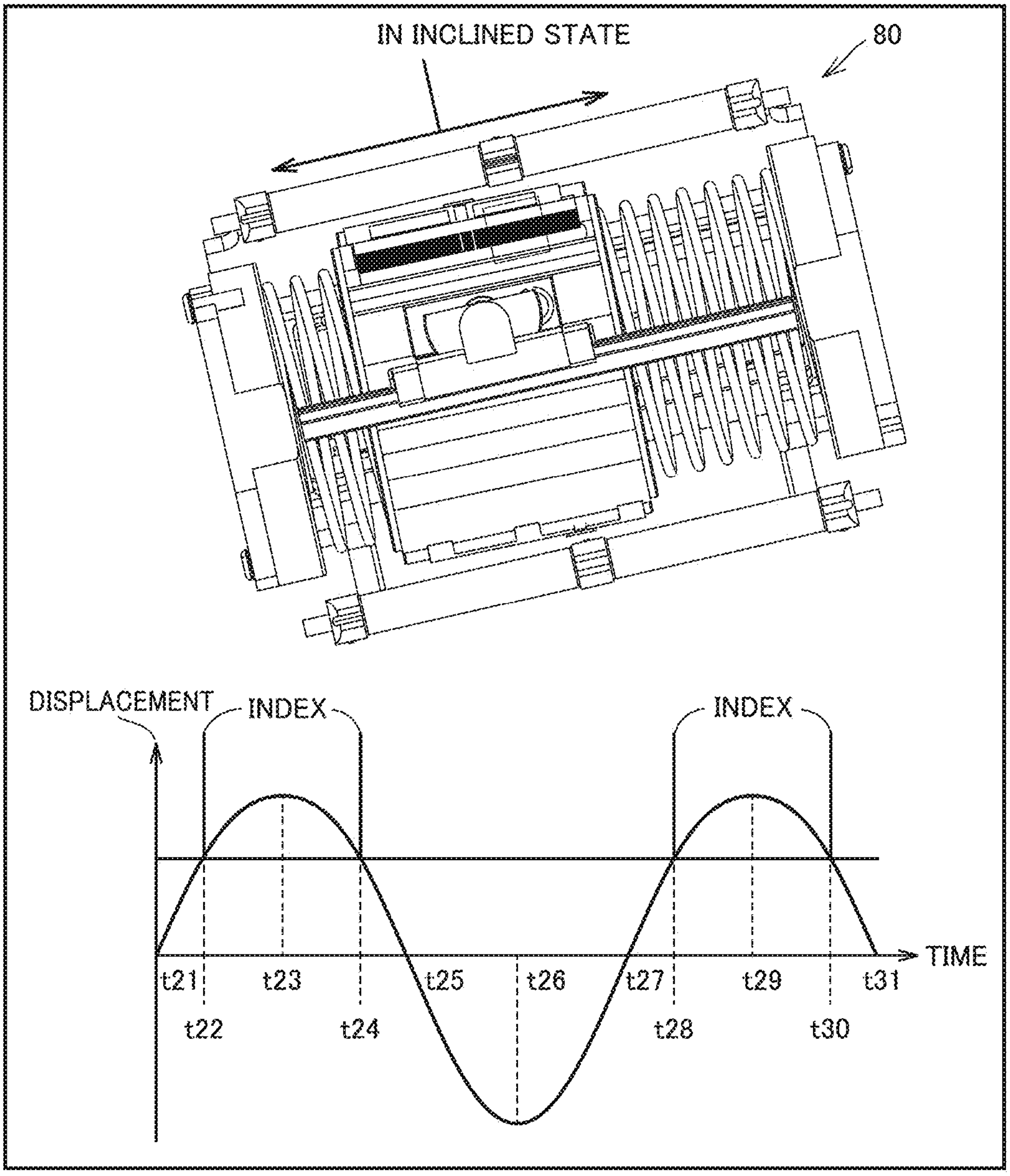
FIGS. 12 and 13 are each a diagram for illustrating reciprocating motion of the lens when the handpiece according to the embodiment is inclined in a vertical direction from the reference state.
Figure 13:
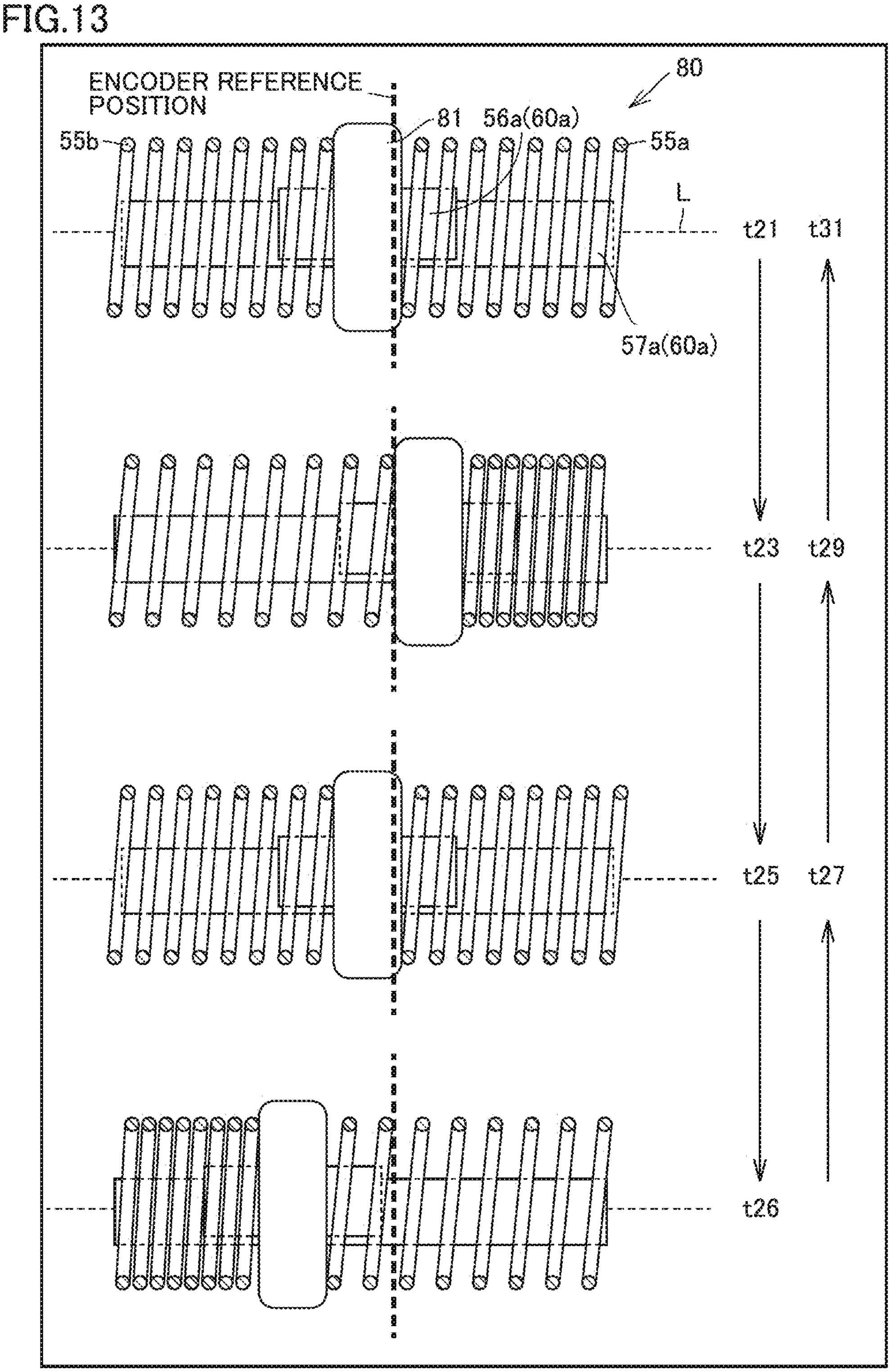

Reciprocating motion of lens 81 when handpiece 70 is inclined in the vertical direction from the reference state will be described with reference to FIGS. 12 and 13. FIGS. 12 and 13 are each a diagram for illustrating reciprocating motion of lens 81 when handpiece 70 according to the embodiment is inclined in the vertical direction from the reference state.

FIG. 12 shows a graph in which the abscissa represents time and the ordinate represents displacement of lens 81. Specifically, in the graph in FIG. 12, at each timing (t21 to t31) that comes with lapse of time, the amount of displacement of lens 81 in movement in the first direction (for example, to the right on the sheet plane) is plotted on the positive side, whereas the amount of displacement of lens 81 in movement in the second direction (for example, to the left on the sheet plane) opposite to the first direction is plotted on the negative side.

For example, as shown in FIGS. 12 and 13, an example in which lens 81 moves and makes reciprocating linear motion with handpiece 70 being inclined in the vertical direction from the reference state is assumed. At t21, lens 81 moves in the first direction (to the right on the sheet plane) from the central position of reciprocating motion. At t22, lens 81 passes through the encoder reference position, and at t23, lens 81 moves in the first direction (to the right on the sheet plane) to its maximum. Thereafter, owing to elastic force of spring 55*a*, lens 81 returns in the second direction (to the left on the sheet plane). At t24, lens 81 passes through the encoder reference position, further at t25, lens 81 passes through the central position of reciprocating motion, and at time t26, lens 81 moves in the second direction (to the left on the sheet plane) to its maximum. Thereafter, owing to elastic force of spring 55*b*, lens 81 returns in the first direction (to the right on the sheet plane). At t27, lens 81 passes through the central position of reciprocating motion, further at t28, lens 81 passes through the encoder reference position, and at t29, lens 81 moves in the first direction (to the right on the sheet plane) to its maximum. Thereafter, owing to elastic force of spring 55*a*, lens 81 returns in the second direction (to the left on the sheet plane). At t30, lens 81 passes through the encoder reference position, and at t31, lens 81 returns to the central position of reciprocating motion.

During reciprocating motion of lens 81 as described above, encoder 82 detects index portion 82*b* being located at the encoder reference position and detects variation in angle of inclination of lens 81 with respect to the prescribed direction. In the example in FIGS. 12 and 13, encoder 82 detects index portion 82*b* being located at the encoder reference position at the timing (t22, t24, t28, and t30) when the amount of displacement of lens 81 attains to a prescribed amount. Control device 40 can detect variation in angle of inclination of lens 81 with respect to the prescribed direction by converting the amount of displacement of lens 81 obtained from encoder 82 to the angle of inclination of lens 81 with respect to the prescribed direction.

[Control of Operation of Lens in Accordance with Angle of Inclination]

Figure 14:
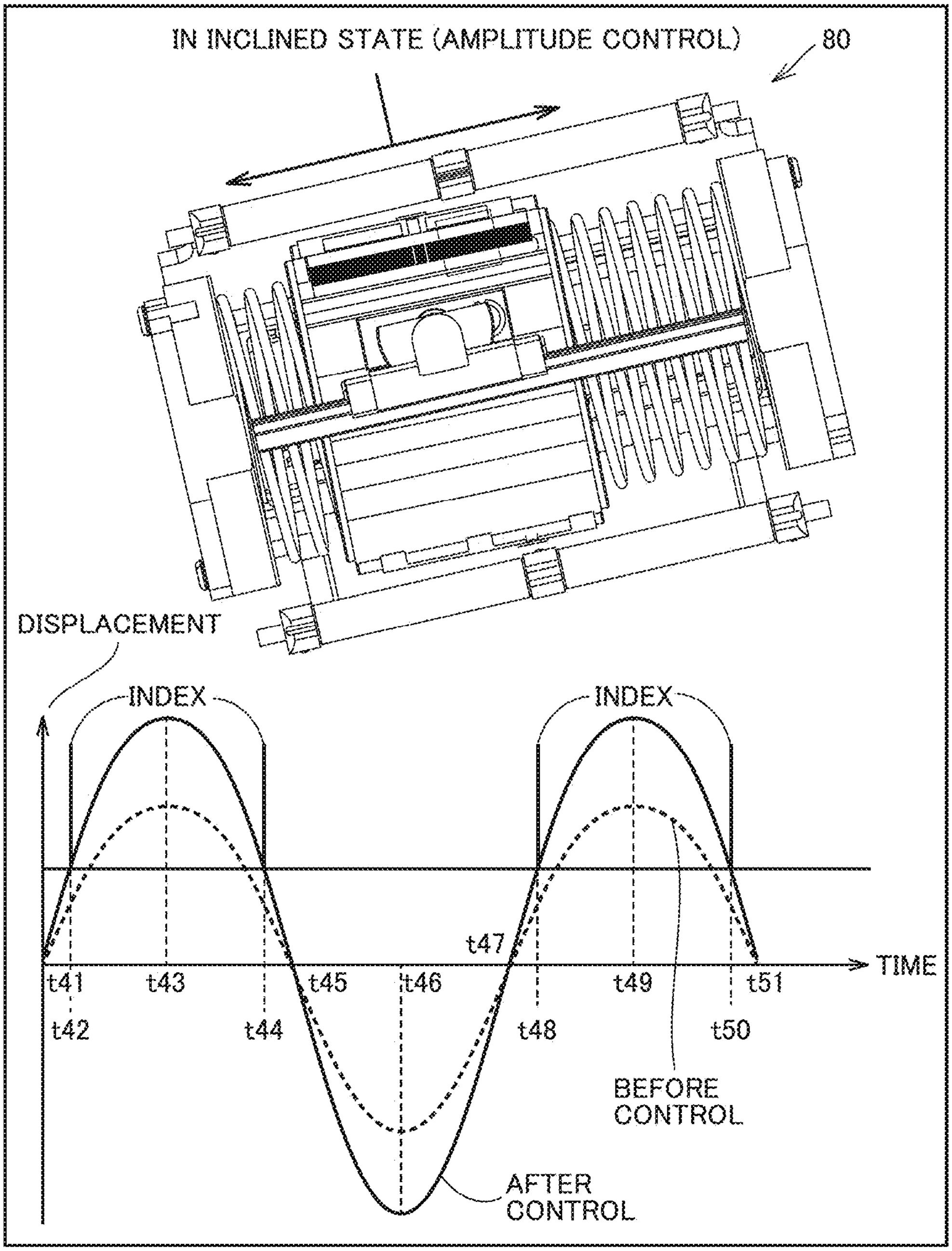
FIGS. 14 and 15 are each a diagram for illustrating amplitude control carried out when the handpiece according to the embodiment is inclined in the vertical direction from the reference state.
Figure 15:
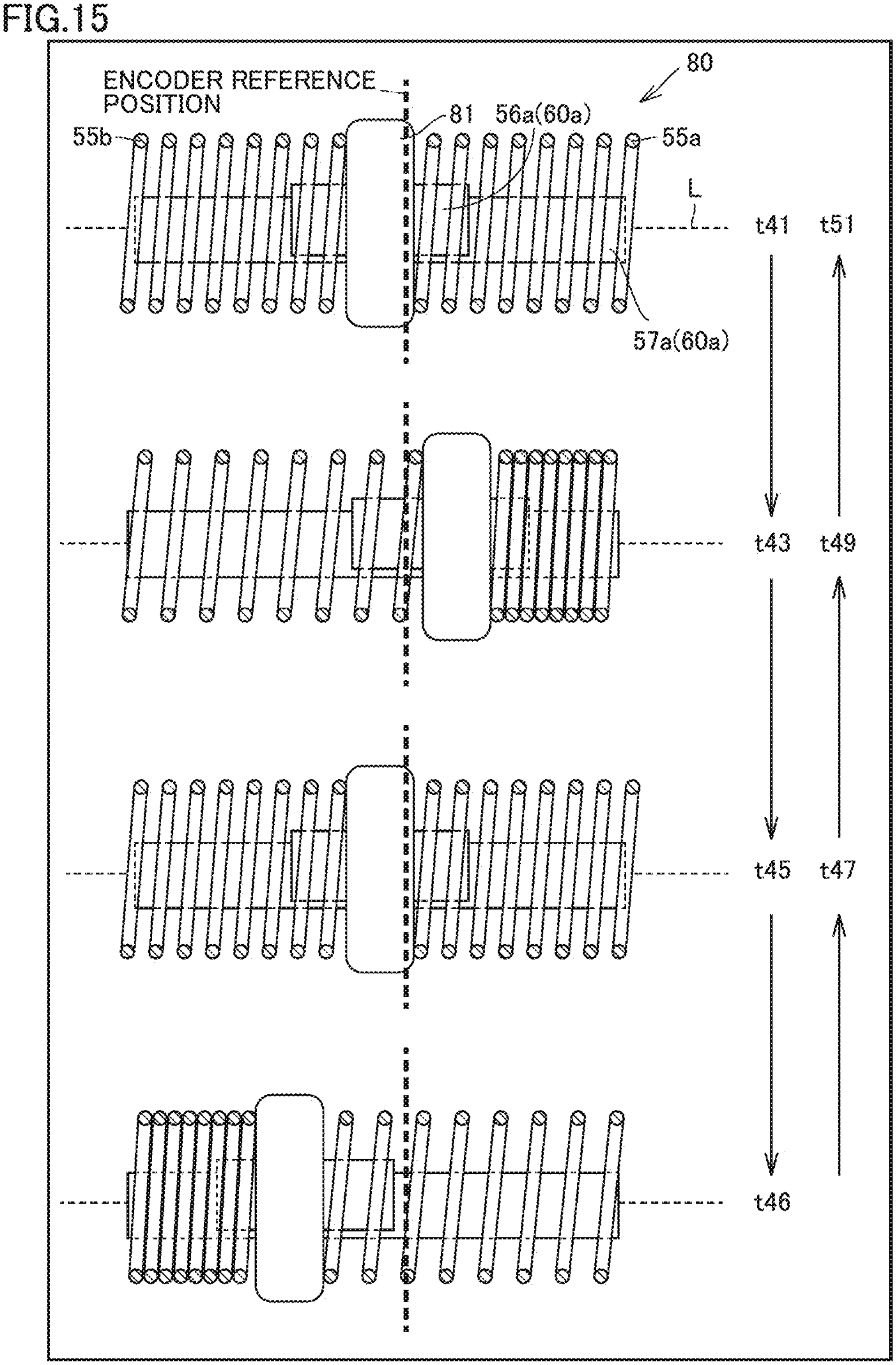

Control of lens 81 in accordance with the angle of inclination of lens 81 with respect to the prescribed direction will be described with reference to FIGS. 14 to 16. FIGS. 14 and 15 are each a diagram for illustrating amplitude control carried out when handpiece 70 according to the embodiment is inclined in the vertical direction from the reference state.

As exemplified in FIGS. 12 and 13, when control device 40 detects variation in angle of inclination of lens 81 with respect to the prescribed direction, it changes the amplitude of reciprocating motion of lens 81 with detected variation in angle of inclination. Specifically, as shown in FIGS. 14 and 15, control device 40 increases the amplitude of reciprocating motion of lens 81 with variation in angle of inclination of lens 81. Control device 40 can increase the amplitude of reciprocating linear motion of lens 81 by varying the drive current with variation in angle of inclination of lens 81.

FIG. 14 shows a graph of an amount of displacement of lens 81 with respect to time after amplitude control, together with a graph of an amount of displacement of lens 81 with respect to time before amplitude control. As shown in FIGS. 14 and 15, after amplitude control, the amount of displacement of lens 81 varies as below.

At t41, lens 81 moves in the first direction (to the right on the sheet plane) from the central position of reciprocating motion. At t42, lens 81 passes through the encoder reference position, and at t43, lens 81 moves in the first direction (to the right on the sheet plane) to the maximum. At this time, the amount of displacement of lens 81 after amplitude control is larger than the amount of displacement of lens 81 before amplitude control. Thereafter, owing to elastic force of spring 55*a*, lens 81 returns in the second direction (to the left on the sheet plane). At t44, lens 81 passes through the encoder reference position, further at t45, lens 81 passes through the central position of reciprocating motion, and at t46, lens 81 moves in the second direction (to the left on the sheet plane) to the maximum. At this time, the amount of displacement of lens 81 after amplitude control is larger than the amount of displacement of lens 81 before amplitude control. Thereafter, owing to elastic force of spring 55*b*, lens 81 returns in the first direction (to the right on the sheet plane). At t47, lens 81 passes through the central position of reciprocating motion, further at t48, lens 81 passes through the encoder reference position, and at t49, lens 81 moves in the first direction (to the right on the sheet plane) to the maximum. At this time, the amount of displacement of lens 81 after amplitude control is larger than the amount of displacement of lens 81 before amplitude control. Thereafter, owing to elastic force of spring 55*a*, lens 81 returns in the second direction (to the left on the sheet plane). At t50, lens 81 passes through the encoder reference position, and at t51, lens 81 returns to the central position of reciprocating motion.

Figure 16:
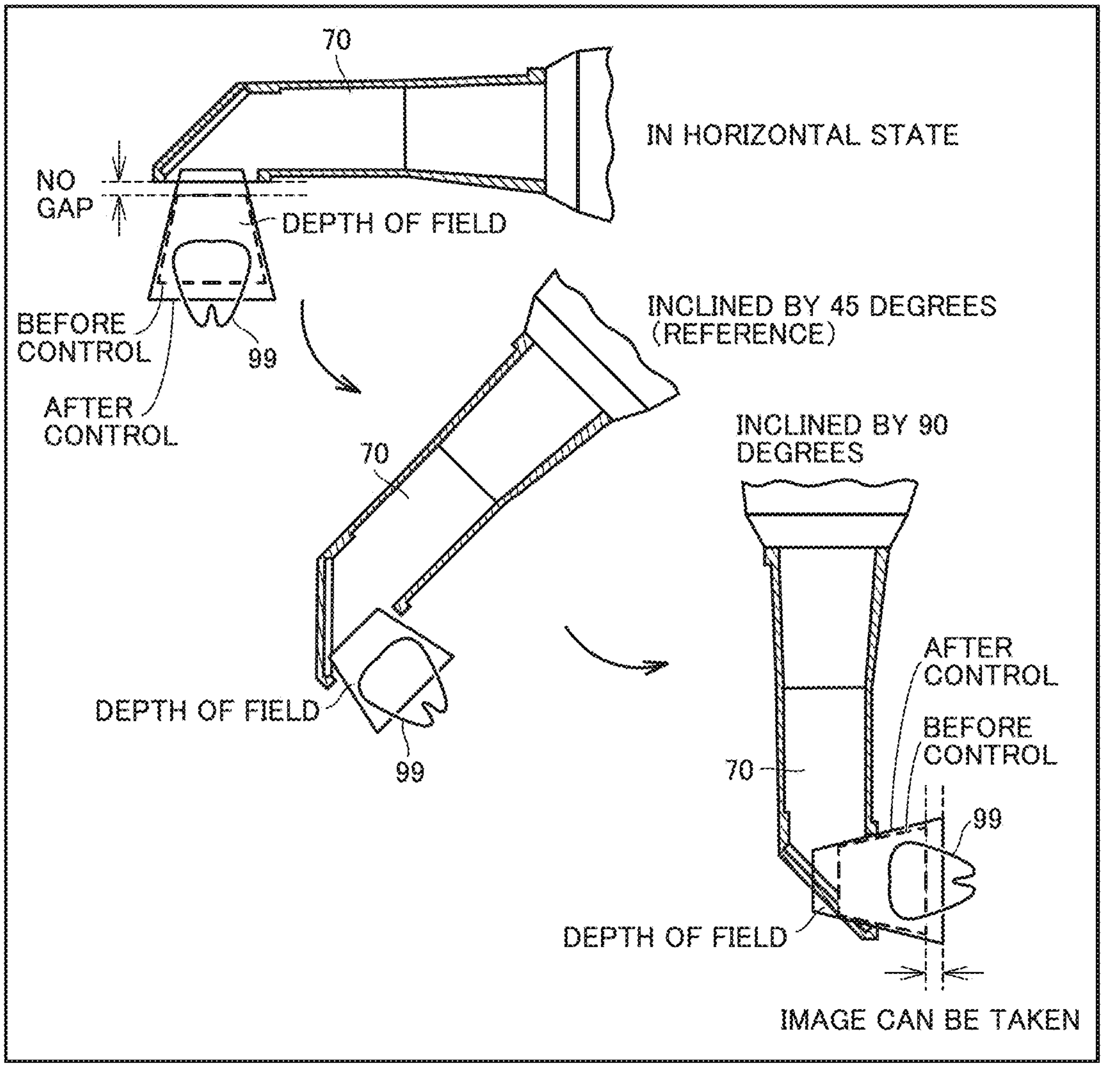
FIG. 16 is a diagram showing a position of the depth of field in accordance with the angle of inclination of the lens when amplitude control is carried out in the three-dimensional scanner according to the embodiment.

FIG. 16 is a diagram showing a position of the depth of field in accordance with the angle of inclination of lens 81 when amplitude control is carried out in three-dimensional scanner 100 according to the embodiment. As shown in FIG. 7, in the comparative example before amplitude control, when handpiece 70 is in the horizontal state, the focal position of lens 81 is more distant from the tip end of handpiece 70 than in inclination of handpiece 70 by 45 degrees and there is a gap between the tip end of handpiece 70 and the depth of field. In contrast, as shown in FIG. 16, the amount of displacement of lens 81 is larger after amplitude control than before amplitude control, so that the depth of field is larger than before amplitude control and there is no gap between the tip end of handpiece 70 and the depth of field either.

As shown in FIG. 7, in the comparative example before amplitude control, when handpiece 70 is inclined in the vertical direction, the focal position of lens 81 is closer to the tip end of handpiece 70 than in inclination of handpiece 70 by 45 degrees, and the part of object 99 (for example, the lower portion of object 99) which is the target of imaging by the user is not included in the depth of field. In contrast, as shown in FIG. 16, after amplitude control, the amount of displacement of lens 81 is larger than before amplitude control, so that the depth of field is larger than before amplitude control, and the depth of field can include the lower portion of object 99 which is the target of imaging by the user.

[Control of Frame Rate in Accordance with Angle of Inclination]

Figure 17:
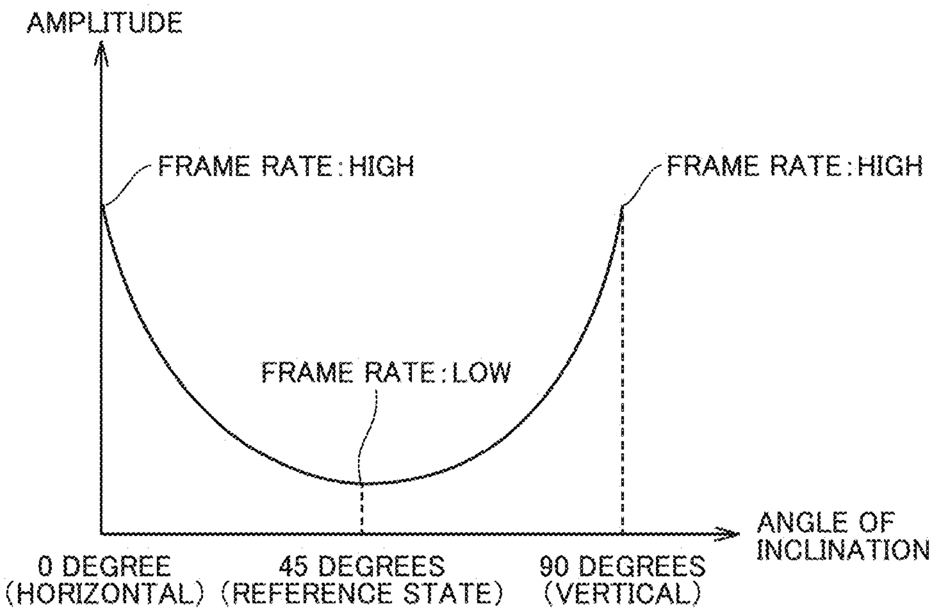
FIG. 17 is a diagram for illustrating control of a frame rate in accordance with the angle of inclination in the three-dimensional scanner according to the embodiment.

Control of a frame rate in accordance with the angle of inclination of lens 81 will be described with reference to FIG. 17. FIG. 17 is a diagram for illustrating control of the frame rate in accordance with the angle of inclination in three-dimensional scanner 100 according to the embodiment.

As described above, control device 40 increases the amount of displacement in reciprocating linear motion of lens 81 by carrying out amplitude control in accordance with the angle of inclination of lens 81. With increase in amount of displacement of lens 81, a range of imaging by optical sensor 71 becomes wider. Then, in order to ensure accuracy in measurement after amplitude control as high as that before amplitude control, control device 40 controls optical sensor 71 such that a frame rate thereof is higher than before amplitude control.

For example, when handpiece 70 is in the horizontal state or inclined in the vertical direction as shown in FIG. 17, the amplitude of lens 81 is larger than when handpiece 70 is in the reference state in which the handpiece is inclined in the vertical direction by 45 degrees from the horizontal direction, and hence control device 40 accordingly controls optical sensor 71 to increase the frame rate thereof.

Since three-dimensional scanner 100 can thus take an image of object 99 at a resolution as high as that before amplitude control even when the depth of field is made larger by increasing the amplitude of lens 81 in amplitude control, accuracy in measurement as high as that before amplitude control can be ensured.

[Process Flow in Control Device]

Figure 18:
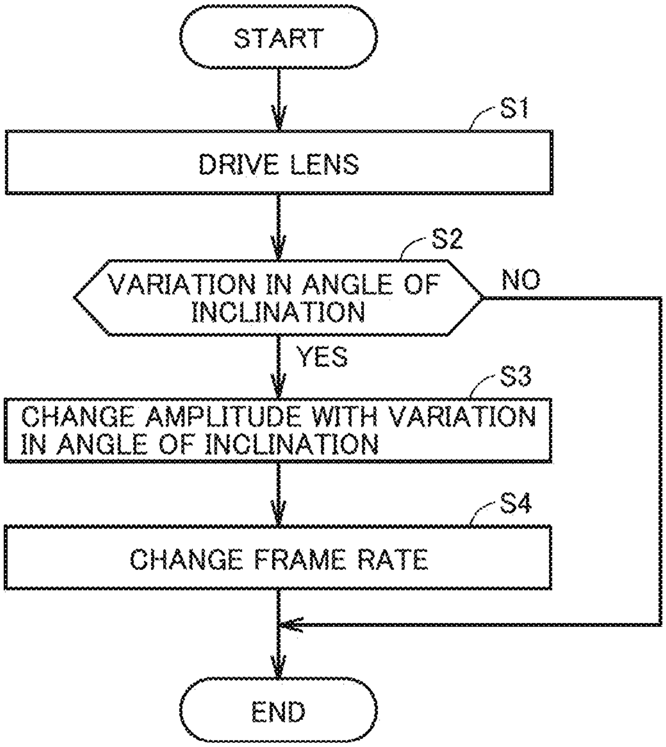
FIG. 18 is a flowchart of amplitude control carried out by a control device in the three-dimensional scanner according to the embodiment.

FIG. 18 is a flowchart of amplitude control carried out by control device 40 in three-dimensional scanner 100 according to the embodiment. Each STEP (which is denoted as "S" below) shown in FIG. 18 is performed by execution of control program 43 by computing unit 41 of control device 40.

As shown in FIG. 18, control device 40 has the drive current supplied to magnetic circuitry 85 to drive lens 81 to make reciprocating linear motion (S1). Control device 40 determines whether or not the angle of inclination of handpiece 70, that is, the angle of inclination of lens 81, has varied, based on a detection value from encoder 82 (S2).

When the angle of inclination of lens 81 has not varied (NO in S2), control device 40 quits the present process flow. When the angle of inclination of lens 81 has varied (YES in S2), on the other hand, control device 40 changes the amplitude of lens 81 in reciprocating linear motion by varying the drive current to be supplied to magnetic circuitry 85 in accordance with the angle of inclination of lens 81 (S3). For example, control device 40 increases the amplitude of lens 81 in reciprocating linear motion by increasing the drive current to be supplied to magnetic circuitry 85 in accordance with the angle of inclination of lens 81 as shown in FIGS. 14 to 16.

When control device 40 changes the amplitude of lens 81 in reciprocating linear motion, it controls optical sensor 71 to change the frame rate (S4). For example, as shown in FIG. 17, when control device 40 increases the amplitude of lens 81 in reciprocating linear motion, it controls optical sensor 71 to increase the frame rate. Thereafter, the control device quits the present process flow.

As set forth above, since three-dimensional scanner 100 according to the embodiment can detect variation in angle of inclination of lens 81 and control the operation of lens 81 in accordance with detected variation in angle of inclination to set the focal position of lens 81 on object 99 regardless of the angle of inclination of lens 81, it can appropriately obtain three-dimensional data of the surface geometry of object 99.

When the depth of field is made larger regardless of the angle of inclination of lens 81, the drive current becomes greater even when the depth of field is appropriate as in the reference state. Therefore, the drive current is uselessly consumed and an amount of heat generation also increases. Since the depth of field is large even in the reference state, an image of an unnecessary portion which is not a target of imaging may be taken, computing load for erasure of the unnecessary portion is imposed, and accordingly a computing speed is lowered and the amount of heat generation also increases. In three-dimensional scanner 100 according to the embodiment, however, the depth of field is varied with variation in angle of inclination of lens 81. Therefore, in the reference state, the drive current is not uselessly consumed and an image of an unnecessary portion which is not a target of imaging is not taken either.

<Modification>

The present disclosure is not limited to the embodiment above, but can variously be modified and applied. A modification applicable to the present disclosure will be described below. Only a difference of three-dimensional scanner 100 according to the modification from three-dimensional scanner 100 according to the embodiment will be described, and a component identical to that of three-dimensional scanner 100 according to the embodiment has the same reference character allotted and description thereof will not be repeated.

In three-dimensional scanner 100 according to the embodiment, control device 40 controls the drive current in accordance with variation in angle of inclination of lens 81 to change the amplitude of reciprocating motion of lens 81. Three-dimensional scanner 100 according to the modification may include a mechanism (structure) that changes a central position of reciprocating motion of lens 81 with variation in angle of inclination of lens 81. More specifically, three-dimensional scanner 100 according to the modification may include a mechanism that sets, with variation in angle of inclination of lens 81, the central position of reciprocating motion of lens 81 back to a position before variation in angle of inclination of lens 81.

Figure 19:
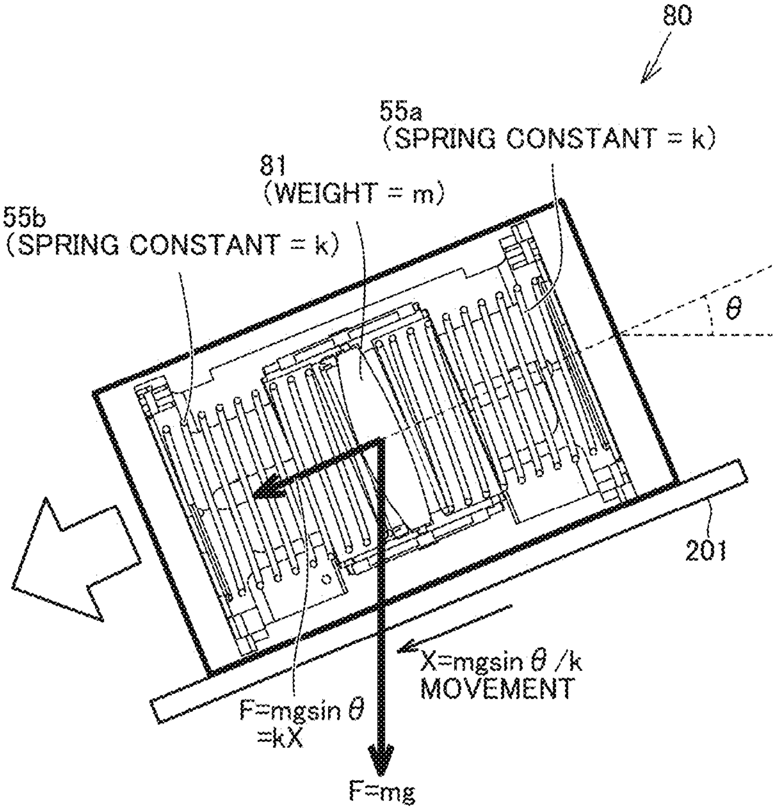
FIGS. 19 and 20 are each a diagram for illustrating the three-dimensional scanner according to a modification.
Figure 20:
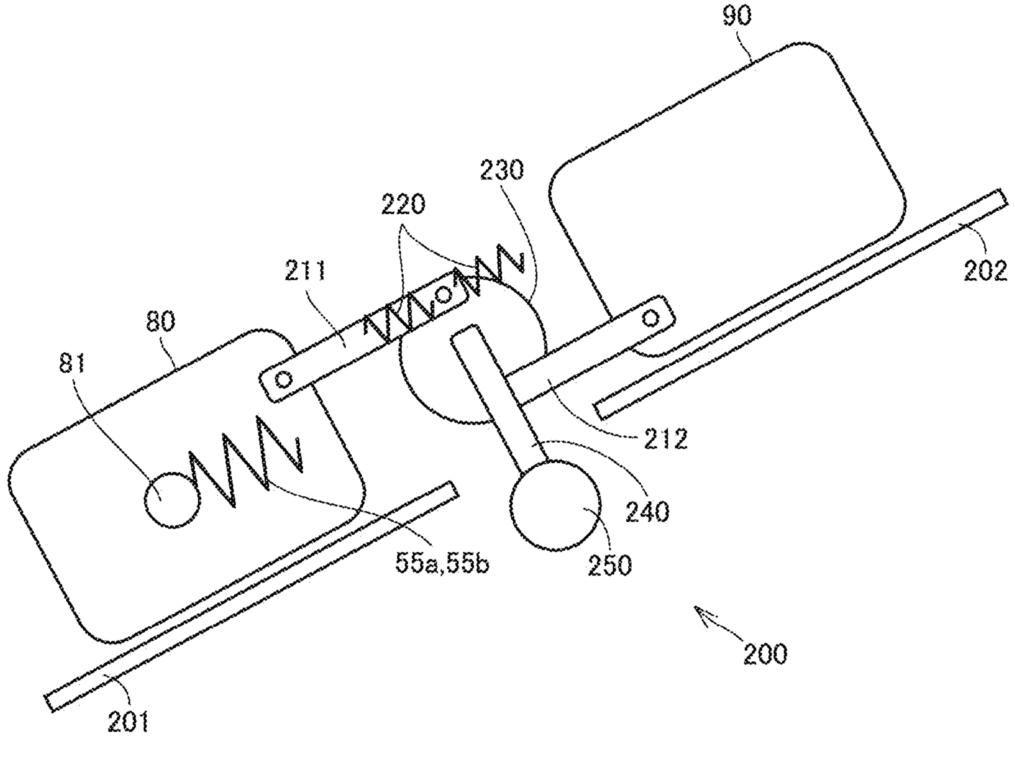

FIGS. 19 and 20 are each a diagram for illustrating three-dimensional scanner 100 according to the modification. As shown in FIG. 19, "m" represents a weight of lens 81, "k" represents a total of spring constants of spring 55*a* and spring 55*b*, "θ" represents an angle of inclination of lens 81 with respect to the prescribed direction, and "X" represents an amount of movement of lens 81 in a downward direction of inclination. Since the gravity of lens 81 is defined as "F=mg", a downward component in the direction of inclination, of gravity applied to lens 81 is defined as "F=mg sin θ". Force applied by spring 55*a* and spring 55*b* to lens 81 is defined as "F=kX". Therefore, the amount of movement of lens 81 in the downward direction of inclination is expressed as "X=mg sin θ/k".

Lens 81 is thus moved in the downward direction of inclination by "X=mg sine/k" in accordance with the angle of inclination of lens 81. As shown in FIG. 20, in three-dimensional scanner 100 according to the modification, handpiece 70 includes a movement mechanism 200 that moves lens 81 in an upward direction of inclination by "X=mg sin θ/k", by way of example of the "lens controller."

Movement mechanism 200 includes linear sliders 201 and 202, a disc 230, links 211 and 212, a spring 220, a support portion 240, and a balance weight 250. Linear slider 201 movably supports lens driver 80. Linear slider 202 movably supports counterweight driver 90. Link 211 connects lens driver 80 and disc 230 to each other. In this example, disc 230 rotates counterclockwise with movement of link 211 in the downward direction of inclination. Link 212 connects counterweight driver 90 and disc 230 to each other. In this example, disc 230 rotates clockwise with movement of link 212 in the downward direction of inclination. Balance weight 250 is connected to disc 230 with support portion 240 being interposed.

According to movement mechanism 200 configured as described above, regardless of the angle of inclination of handpiece 70, lens driver 80 and counterweight driver 90 are balanced with each other owing to links 211 and 212 and disc 230. Since equivalent force is applied to lens driver 80 and counterweight driver 90 by spring 220 in directions opposite to each other, positional relation between lens driver 80 and counterweight driver 90 is stabilized even when handpiece 70 is in the horizontal state.

Since lens 81 is moved in the downward direction of inclination by "X=mg sin θ/k" in the inside of lens driver 80, lens 81 should be moved in the upward direction of inclination. In this connection, owing to the weight of balance weight 250 connected to disc 230 with support portion 240 being interposed, disc 230 rotates clockwise, so that lens driver 80 moves in the upward direction of inclination by "X=mg sin θ/k" together with lens 81.

Since three-dimensional scanner 100 according to the modification can thus move lens 81 in the upward direction of inclination by "X=mg sine/k" with variation in angle of inclination of lens 81, the central position of reciprocating motion of lens 81 can be set back to the position before variation in angle of inclination of lens 81.

A camera for medical use that takes a picture of the inside of the mouth cavity or the inside of the outer ear or the digestive system such as the stomach or the intestines may be applicable as a medical care apparatus to which three-dimensional scanner 100 is applied. In this case, a lens of the camera may be applicable as an object to be held by a mover of the linear motor and a counterweight may be applicable as another mover.

A microscope may be applicable as a medical care apparatus to which three-dimensional scanner 100 is applied. In this case, a lens in the microscope may be applicable as an object to be held by a mover of the linear motor and a counterweight may be applicable as another mover.

Furthermore, a laser pointer that points an object such as a diagram with laser beams or a laser apparatus that cuts a tooth may be applicable as a medical care apparatus to which three-dimensional scanner 100 is applied. In this case, a lens may be applicable as an object to be held by a mover of the linear motor and a counterweight may be applicable as another mover.

It should be understood that the embodiment disclosed herein is illustrative and non-restrictive in every respect. The scope of the present disclosure is defined by the terms of the claims rather than the description above and is intended to include any modifications within the scope and meaning equivalent to the terms of the claims. Features exemplified in the embodiment and features exemplified in the modification can be combined as appropriate.

What is claimed is:

1. A three-dimensional scanner configured to obtain three-dimensional data of a surface geometry of an object with a focus method, the three-dimensional scanner comprising:
- a lens;
- a hand-held housing in which the lens is accommodated;
- imaging circuitry configured to take an image of the object located at a focal position of the lens;
- a lens driver configured to drive the lens to make reciprocating motion in a linear direction;
- an angle detector configured to detect variation in angle of inclination of the lens with respect to a prescribed direction when a state of the hand-held housing changes between a state in which the hand-held housing is oriented to a horizontal direction and a state in which the hand-held housing is oriented to a vertical direction; and
- processing circuitry configured to control an operation of the lens in accordance with the variation in angle of inclination detected by the angle detector, wherein
- the processing circuitry is configured to increase an amplitude of the reciprocating motion of the lens or set a central position of the reciprocating motion back to a position before the variation in angle of inclination.

2. The three-dimensional scanner according to claim 1, wherein
- the imaging circuitry is configured to change a frame rate of imaging of the object in accordance with the variation in angle of inclination.

3. The three-dimensional scanner according to claim 2, wherein
- the imaging circuitry is configured to increase the frame rate in accordance with the variation in angle of inclination.

4. The three-dimensional scanner according to claim 1, wherein
- the angle detector is an incremental encoder or an absolute encoder.

5. The three-dimensional scanner according to claim 1, further comprising:

a counterweight having a mass approximately the same as a mass of the lens;

a counterweight driver configured to drive the counterweight to make reciprocating motion in a direction opposite to the reciprocating motion of the lens; wherein the processing circuitry is configured to control an operation of the counterweight in accordance with the operation of the lens.

6. A control method of controlling a three-dimensional scanner configured to obtain three-dimensional data of a surface geometry of an object with a focus method, the control method comprising, as processing to be performed by a computer:

taking an image of the object located at a focal position of a lens provided in a hand-held housing of the three-dimensional scanner;

driving the lens to make reciprocating motion in a linear direction;

detecting variation in angle of inclination of the lens with respect to a prescribed direction when a state of the hand-held housing changes between a state in which the hand-held housing is oriented to a horizontal direction and a state in which the hand-held housing is oriented to a vertical direction; and controlling an operation of the lens in accordance with the variation in angle of inclination detected in the detecting variation, wherein the controlling an operation of the lens includes increasing an amplitude of the reciprocating motion of the lens or setting a central position of the reciprocating motion back to a position before the variation in angle of inclination.

7. The control method according to claim 6, wherein controlling an operation of the lens includes changing a frame rate of imaging of the object in accordance with the variation in angle of inclination.

8. The control method according to claim 7, wherein changing the frame rate of imaging includes increasing the frame rate in accordance with the variation in angle of inclination.

9. The control method according to claim 6, wherein the variation in angle of inclination is detected via an incremental encoder or an absolute encoder.

10. The control method according to claim 6, further comprising:

controlling an operation of a counterweight to make reciprocating motion in a direction opposite to the reciprocating motion of the lens in accordance with the operation of the lens, wherein the counterweight has a mass approximately the same as a mass of the lens.

* * * * *